(12) United States Patent
Wang et al.

(10) Patent No.: US 6,225,406 B1
(45) Date of Patent: *May 1, 2001

(54) REACTIVE EXTRUSION METHOD OF MAKING INVERSE PHASE BLENDS OF POLY(ETHYLENE OXIDE) AND POLYOLEFIN

(75) Inventors: James H. Wang, Appleton, WI (US); David M. Schertz, Atlanta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/330,583

(22) Filed: Jun. 11, 1999

Related U.S. Application Data

(63) Continuation-in-part of application No. 08/855,324, filed on May 13, 1997, now Pat. No. 5,912,076.
(60) Provisional application No. 60/034,235, filed on Dec. 31, 1996.

(51) Int. Cl.[7] .............................. C08L 23/02; C08L 51/06
(52) U.S. Cl. ............................... 525/64; 525/63; 525/187
(58) Field of Search .................................. 525/64, 83, 187

(56) References Cited

U.S. PATENT DOCUMENTS

| | | |
|---|---|---|
| Re. 25,880 | 10/1965 | Cline . |
| 3,323,978 | 6/1967 | Rasmussen . |
| 3,340,327 | 9/1967 | Spellberg . |
| 3,539,666 | 11/1970 | Schirmer . |
| 3,544,655 | 12/1970 | Booth et al. . |
| 3,666,737 | 5/1972 | Lal et al. . |
| 3,670,731 | 6/1972 | Harron . |
| 3,676,529 | 7/1972 | Fall et al. . |
| 3,717,541 | 2/1973 | Schirmer . |
| 3,734,876 | 5/1973 | Chu . |
| 3,763,277 | 10/1973 | Chu et al. . |
| 3,830,888 | 8/1974 | King . |
| 3,833,708 | 9/1974 | Miller et al. . |
| 3,843,589 | 10/1974 | Wartman . |
| 3,867,324 | 2/1975 | Clendinning . |
| 3,891,584 | 6/1975 | Ray-Chaudhuri et al. . |
| 3,933,943 | 1/1976 | Fahrbach et al. . |
| 3,935,141 | 1/1976 | Potts . |
| 3,953,655 | 4/1976 | Steinkamp et al. . |
| 3,954,928 | 5/1976 | Omori et al. . |
| 3,957,605 | 5/1976 | Assarsson et al. . |
| 3,963,805 | 6/1976 | Chu . |
| 3,972,961 | 8/1976 | Hammer et al. . |
| 3,993,551 | 11/1976 | Assarsson et al. . |
| 4,018,729 | 4/1977 | Faucher et al. . |
| 4,021,509 | 5/1977 | Murayama et al. . |
| 4,029,720 | 6/1977 | Seiler et al. . |
| 4,032,993 | 7/1977 | Coquard et al. . |
| 4,080,405 | 3/1978 | Agouri et al. . |
| 4,186,233 | 1/1980 | Krajewski et al. . |
| 4,225,650 | 9/1980 | van Brederode et al. . |
| 4,229,334 | 10/1980 | Klabacka et al. . |
| 4,496,619 | 1/1985 | Okamoto . |
| 4,511,687 | 4/1985 | Nakanishi . |
| 4,528,334 | 7/1985 | Knopf et al. . |
| 4,585,835 | 4/1986 | Saegusa . |
| 4,594,389 | 6/1986 | Lal . |
| 4,617,235 | 10/1986 | Shinonome et al. . |
| 4,619,988 | 10/1986 | Leung et al. . |
| 4,627,950 | 12/1986 | Matsui et al. . |
| 4,705,525 | 11/1987 | Abel et al. . |
| 4,705,526 | 11/1987 | Abel et al. . |
| 4,725,492 | 2/1988 | Yazaki et al. . |
| 4,792,477 | 12/1988 | Ochiumi . |
| 4,795,668 | 1/1989 | Krueger et al. . |
| 4,810,612 | 3/1989 | Ueda et al. . |
| 4,840,851 | 6/1989 | Golander et al. . |
| 4,857,602 | 8/1989 | Casey . |
| 4,868,222 | 9/1989 | Chau et al. . |
| 4,874,540 | 10/1989 | Greenwald et al. . |
| 4,883,699 | 11/1989 | Aniuk et al. . |
| 4,966,808 | 10/1990 | Kawano . |
| 5,011,892 | 4/1991 | Engelhardt et al. . |
| 5,041,496 | 8/1991 | Engelhardt et al. . |
| 5,059,630 | 10/1991 | Fujita et al. . |
| 5,075,061 | 12/1991 | Howell . |
| 5,095,619 | 3/1992 | Davis et al. . |
| 5,097,004 | 3/1992 | Gallagher et al. . |
| 5,097,005 | 3/1992 | Tiez . |
| 5,209,849 | 5/1993 | Hu et al. . |
| 5,216,050 | 6/1993 | Sinclair . |
| 5,217,495 | 6/1993 | Kaplan et al. . |
| 5,217,798 | 6/1993 | Brady et al. . |
| 5,219,646 | 6/1993 | Gallagher et al. . |
| 5,260,371 | 11/1993 | Chen . |
| 5,264,491 | 11/1993 | Quirk . |

(List continued on next page.)

FOREIGN PATENT DOCUMENTS

| | | |
|---|---|---|
| 52355/93 | 3/1994 | (AU) . |
| 2513251 | 9/1976 | (DE) . |

(List continued on next page.)

OTHER PUBLICATIONS

Derwent Publications Ltd., Database WPI, JP 08 212995 (Mitsubishi Paper Mills Ltd.), Aug. 20, 1996.

(List continued on next page.)

Primary Examiner—Patricia A. Short
(74) Attorney, Agent, or Firm—Kilpatrick Stockton LLP

(57) ABSTRACT

Methods of making inverse phase compositions comprising a polyolefin, such as polyethylene, and poly(ethylene oxide) are described. The inverse phase compositions exhibit an inverse phase in which the volume minority constituent, the poly(ethylene oxide), forms a continuous phase and volume majority constituent, the polyolefin, forms a dispersed or discontinuous phase in the continuous poly(ethylene oxide) phase. The inverse phase compositions have beneficial water degradable properties and can be used in the manufacture of disposable personal hygiene articles. In at least one desirable embodiment, the polyolefin and the poly(ethylene oxide) are grafted with a polar, vinyl monomer in a reactive extrusion process.

29 Claims, 13 Drawing Sheets

U.S. PATENT DOCUMENTS

| | | |
|---|---|---|
| 5,300,574 | 4/1994 | Bacskai . |
| 5,304,420 | 4/1994 | Hirakawa et al. . |
| 5,342,861 | 8/1994 | Raykovitz . |
| 5,346,959 | 9/1994 | Goman . |
| 5,354,618 | 10/1994 | Ishigaki et al. . |
| 5,360,419 | 11/1994 | Chen . |
| 5,364,907 | 11/1994 | Rolando et al. . |
| 5,366,804 | 11/1994 | Dugan . |
| 5,367,003 | 11/1994 | Petcavich . |
| 5,369,168 | 11/1994 | Famili et al. . |
| 5,382,703 | 1/1995 | Nohr et al. . |
| 5,385,974 | 1/1995 | Ohmae . |
| 5,391,423 | 2/1995 | Wnuk et al. . |
| 5,395,308 | 3/1995 | Fox et al. . |
| 5,407,442 | 4/1995 | Karapasha . |
| 5,412,029 | 5/1995 | Elm et al. . |
| 5,415,905 | 5/1995 | Middlesworth et al. . |
| 5,417,679 | 5/1995 | Toms et al. . |
| 5,429,874 | 7/1995 | vanPutte et al. . |
| 5,442,016 | 8/1995 | Jarrett . |
| 5,446,100 | 8/1995 | Durrance et al. . |
| 5,466,410 | 11/1995 | Hills . |
| 5,468,259 | 11/1995 | Sheth et al. . |
| 5,470,941 | 11/1995 | Kim et al. . |
| 5,476,909 | 12/1995 | Kim . |
| 5,480,928 | 1/1996 | Stratta . |
| 5,489,470 | 2/1996 | Noda . |
| 5,489,647 | 2/1996 | Kussmaul . |
| 5,498,692 | 3/1996 | Noda . |
| 5,498,785 | 3/1996 | Wang et al. . |
| 5,509,913 | 4/1996 | Yeo . |
| 5,514,380 | 5/1996 | Song . |
| 5,519,085 | 5/1996 | Ma . |
| 5,522,841 | 6/1996 | Roby . |
| 5,530,074 | 6/1996 | Jarrett . |
| 5,532,066 | 7/1996 | Latiolais et al. . |
| 5,540,663 | 7/1996 | Kroner et al. . |
| 5,541,259 | 7/1996 | Doi et al. . |
| 5,549,791 | 8/1996 | Herron et al. . |
| 5,589,545 | 12/1996 | Ramachandran . |
| 5,618,911 | 4/1997 | Kimura . |
| 5,674,578 | 10/1997 | Giori . |
| 5,698,322 | 12/1997 | Tsai et al. . |
| 5,700,872 | 12/1997 | Wang et al. . |
| 5,753,169 | 5/1998 | Kaito et al. . |
| 5,807,930 | 9/1998 | Wang et al. . |

FOREIGN PATENT DOCUMENTS

| | | |
|---|---|---|
| 0080274 | 6/1983 | (EP) . |
| 0184440 | 6/1986 | (EP) . |
| 0210754 | 2/1987 | (EP) . |
| 0436966 | 7/1991 | (EP) . |
| 0438598 | 7/1991 | (EP) . |
| 0473091 | 3/1992 | (EP) . |
| 0488119 | 6/1992 | (EP) . |
| 0507561 | 10/1992 | (EP) . |
| 0612773 | 8/1994 | (EP) . |
| 0640650 | 3/1995 | (EP) . |
| 0648871 | 4/1995 | (EP) . |
| 0705934 | 4/1996 | (EP) . |
| 0725090 | 8/1996 | (EP) . |
| 0761795 | 3/1997 | (EP) . |
| 0781538 | 7/1997 | (EP) . |
| 2070046 | 9/1981 | (GB) . |
| 2295553 | 6/1996 | (GB) . |
| 49-126742 | 12/1974 | (JP) . |
| 60-195151 | 10/1985 | (JP) . |
| 61-181859 | 8/1986 | (JP) . |
| 61-272217 | 12/1986 | (JP) . |
| 5-125123 | 5/1993 | (JP) . |
| 5-309111 | 11/1993 | (JP) . |
| 93-07199 | 4/1993 | (WO) . |
| 94/00163 | 1/1994 | (WO) . |
| 94/00293 | 1/1994 | (WO) . |
| 94/17226 | 8/1994 | (WO) . |
| 95/10645 | 4/1995 | (WO) . |
| 95/11929 | 5/1995 | (WO) . |
| 95/18191 | 7/1995 | (WO) . |
| 95/20614 | 8/1995 | (WO) . |
| 95/20615 | 8/1995 | (WO) . |
| 95/20621 | 8/1995 | (WO) . |
| 95/23249 | 8/1995 | (WO) . |
| 95/23250 | 8/1995 | (WO) . |
| 96/20738 | 7/1996 | (WO) . |
| 96/20831 | 7/1996 | (WO) . |
| 96/21057 | 7/1996 | (WO) . |
| 96/21475 | 7/1996 | (WO) . |
| 97/02375 | 1/1997 | (WO) . |
| 98/36117 | 8/1998 | (WO) . |

OTHER PUBLICATIONS

Standard Test Method for Tensile Properties, *American Society for Testing and Material (ASTM)* Designation: D638–95, 45–56, 1995.

Patent Abstracts of Japan, JP 06–207324 (Unitika Ltd.), Jul. 26, 1994.

Mortensen, Kell et al. Phase Behavior of Poly(propylene Oxide)–Poly(ethylene oxide)–Poly(propylene oxide) Triblock Copolymer Melt and Aqueous Solutions, *Macromolecules*, vol. 27, 20, pp. 5654–5666, 1994.

Tang, Tao and Baotong Huang, Compatibilization of Polypropylene/Poly(Ethylene Oxide) Blends and Crystallization Behavior of the Blends, *Journal of Polymer Science: Part B: Polymer Physics* 32, 1991–1998, 1994.

Hu, Guo–Hua, et al. Free Radical Grafting of Chemically Activated Maleic anhydride onto Polypropylene by Reactive Extrusion—abstract only, *Annu. Tech. Conf.—Soc. Plast. Eng.* 3, pp. 2775–8, 1994.

Song, Z. and W.E. Baker, Melt Grafting of T–Butylaminoethyl Methacrylate Onto Polyethylene, *Polymer*, 33(15 3266–3273), 1992.

Callais, Peter A., et al., The Maleic Anhydride Grafting of Polypropylene with Orgnic Peroxides—abstract only, *Compalloy '90*, pp. 359–69, 1990.

Derwent Publications Ltd., Database WPI, JP 01 246411 (Sawashit A), Oct. 2, 1989.

Derwent Publications, EP 0316792 (Cassella AG), May 24, 1989. Abstract.

Bartczak, Z. and A. Galeski, Changes in Interface Shape During Crystallization in Two–Component Polymer Systems, *Polymer*, 544–548, 1986.

REACTIVE EXTRUSION METHOD OF MAKING INVERSE PHASE BLENDS OF POLY(ETHYLENE OXIDE) AND POLYOLEFIN

This application is a continuation-in-part of U.S. application Ser. No. 08/855,324 filed May 13, 1997, now U.S. Pat. No. 5,912,076 which in turn claims the benefit of U.S. Provisional Application Ser. No. 60/034,235 filed Dec. 31, 1996, the disclosures of which are incorporated herein by reference in their entirety.

FIELD OF THE INVENTION

The present invention relates to methods of making compositions comprising a blend of polyolefin and poly(ethylene oxide) having inverse phase.

BACKGROUND OF THE INVENTION

There are a wide variety of disposable plastic articles of manufacture in use today. Because of their low cost and convenience, they are very popular and have a high consumer demand. However, many of these articles are not degradable or easily disposed of. Consequently, they have caused and continue to cause a waste disposal problem.

Personal care products, such as diapers, sanitary napkins, adult incontinence garments, and the like are generally constructed from a number of different components and materials. Such articles typically have some portion, usually the backing layer, liner, or baffle that is composed of a film constructed from a liquid repellent material. This repellent material is appropriately constructed to minimize or prevent the exuding of the absorbed liquid from the article and to obtain greater utilization of the absorbent capacity of the product. The liquid repellent film commonly used includes plastic materials such as polyethylene films and the like.

Although such products are relatively inexpensive, sanitary and easy to use, disposal of a product once soiled is not without its problems. An ideal disposal method for such products would be to use municipal sewage treatment and private residential septic systems. Products suited for disposal in sewage systems can be flushed down a convenient toilet and are termed "flushable." While flushing such articles would be convenient, the liquid repellent material which normally does not disintegrate in water tends to plug toilets and sewer pipes. It therefore becomes necessary, although undesirable, to separate the barrier film material from the absorbent article prior to flushing.

In an attempt to overcome the flushability problem of a water-resistant film the prior art has modified the water-resistant polymer. One of the more useful ways of modifying polymers involves blending them with other polymers of different structures and properties. In a few cases, polymer blend combinations are thermodynamically miscible and exhibit mechanical compatibility. However, by far a greater number of blends are phase separated and generally exhibit poor mechanical compatibility. Phase separated blends can in some cases exhibit mechanical compatibility where the polymer compositions are similar, for example, polyolefin blended with other similar polyolefins, or where interfacial agents are added to improve the compatibility at the interface between the constituents of the polymer blend.

Polymer blends of polyolefins and poly(ethylene oxide) are melt processible but exhibit very poor mechanical compatibility. This poor mechanical compatibility is particularly manifested in blends having greater than 50 weight percent of polyolefin. Generally the film is not affected by water since typically the majority phase, i.e. polyolefin, will surround and encapsulate the minority phase, i.e. the poly(ethylene oxide). The encapsulation of the poly(ethylene oxide) effectively prevents any degradability and/or flushability advantage that would be acquired by using poly(ethylene oxide).

In view of the problems of the prior art, it remains highly desirable to provide water-degradable compositions comprising poly(ethylene oxide) incorporating greater amounts of lower cost polyolefin(s) while maintaining or at least not significantly decreasing the water responsiveness of the composition. Advantageously, such compositions can be used to manufacture flushable films and flushable fibers at lower cost. These films and fibers can be used as components in personal care products that are designed to be flushed down conventional toilets. Additionally, the unique water related properties of the compositions described herein compositions make the compositions desirable for the manufacture of filter membranes.

SUMMARY OF THE INVENTION

Briefly, the present invention provides for compositions comprising a volume of poly(ethylene oxide) and a greater volume of polyolefin relative to the volume of poly(ethylene oxide) wherein the compositions exhibit an inverse phase morphology. As used herein "inverse phase morphology" means that the volumetric majority constituent, which normally would be expected to form the continuous phase in the composition, is the dispersed phase and the volumetric minority constituent forms the continuous phase in which the volumetric majority constituent is dispersed. Inverse phase polyolefin and poly(ethylene oxide) compositions are desirable because they have improved water responsiveness and water dispersibility compared to compositions comprising the same relative amounts of the aforementioned polymers that do not have inverse phase morphology described above.

The compositions of the present invention lose a substantial amount of mass when exposed to water. Consequently, films, fibers and articles manufactured from the compositions of the present invention exhibit a significant decrease in the their mechanical properties when exposed to water compared to the dry mechanical properties prior to exposure to water. The compositions of the present invention are substantially water degradable and may be used to produce flushable films, fibers and articles. Significantly, films, fibers and articles can be produced which incorporate greater amounts of essentially water-insoluble polyolefins relative to amount of water-soluble poly(ethylene oxide) while remaining water-degradable and flushable. Thus, flushable articles such as diapers and feminine pads can be manufactured with smaller amounts water-soluble and water-responsive resins, at lower cost.

DETAILED DESCRIPTION OF THE INVENTION

Figure 1:
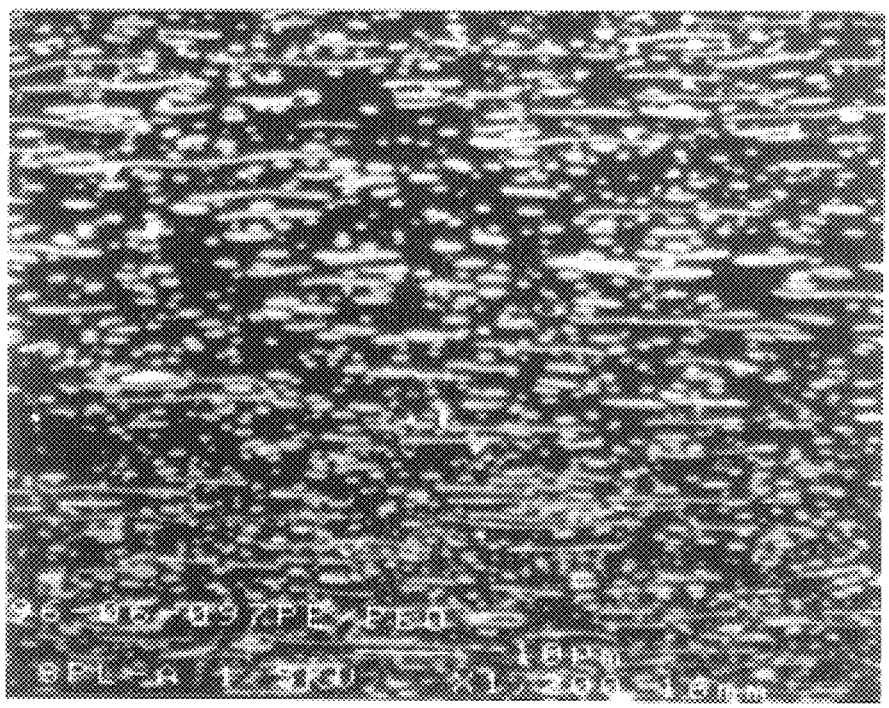
FIG. 1 is a SEM photomicrograph of a back-scattered electron image of a cross-sectional view of a 4 mil (0.004 inch) film from the composition of Comparative Example A, a blend of 60 weight percent LDPE and 40 weight PEO that does not have inverse phase morphology.

Although the present invention is described with reference to a film, one skilled in the art would understand the utility of the invention toward polymer compositions and to articles that can manufactured using the polymer compositions. The compositions of the present invention comprise a larger volume of a polyolefin and a lesser volume of a poly(ethylene oxide) where the poly(ethylene oxide) comprises the continuous phase and the polyolefin comprises the discontinuous phase. In one embodiment, the inverse phase compositions of the present invention comprise a volume majority of a polyolefin. As used herein, "volume majority" means greater amount by volume. The compositions of the Examples are described by reference to weight percentages of the polyolefin component, low density polyethylene, and poly(ethylene oxide) component. Due to the greater density of the poly(ethylene oxide), about 1.2 g/cm$^3$, relative to the low density polyethylene, about 0.9 to 0.94 g/cm$^3$, the volume percentage of polyolefin incorporated in the compositions of the Examples is greater than the weight percentage, e.g. 55 weight percent of low density polyethylene is equal to about 60 volume percent of low density polyethylene.

The compositions of the present invention may comprise as little as 51 percent by volume to as much as 99 percent by volume of a polyolefin and any amount of poly(ethylene oxide) as long as there is a sufficient amount of poly(ethylene oxide) to form a continuous phase around the polyolefin. In one embodiment, the compositions of the present invention comprise from about 51 volume percent to about 95 weight percent of a polyolefin and from about 49 volume percent to about 5 weight percent of poly(ethylene oxide) which may be grafted with a vinyl monomer. In another desirable embodiment, the compositions of the present invention comprise from about 60 volume percent to about 85 volume percent of a polyolefin and from about 40 volume percent to about 15 volume percent of poly(ethylene oxide) grafted with a polar vinyl monomer. Desirably, the polyolefin and the poly(ethylene oxide) are grafted with at least one polar vinyl monomer. It has unexpectedly been discovered that an inverse phase morphology, where the hydrophilic moiety constitutes the continuous phase, can be achieved by a minority component in the film to greatly expand the water sensitivity and degradability of a film. Desirably, the composition of the present invention comprises a blend of from about 60 volume percent to about 85 volume percent of a polyolefin, such as polyethylene, and from about 40 volume percent to about 15 volume percent of poly(ethylene oxide) with an effective amount of monomer grafted onto the polyolefin and poly(ethylene oxide) to render the phase inversion.

Suggested polyolefins useful for the practice of the invention include, but are not limited to, various thermoplastic polyethylenes, polypropylenes, polypropylenes and saturated ethylene polymers. Suggested saturated ethylene polymers useful in the practice of this invention are homopolymers or copolymers of ethylene and are essentially linear in structure. As used herein, the term "saturated" refers to polymers that are fully saturated, but also includes polymers containing up to about 5 percent unsaturation. Homopolymers of ethylene include, but are not limited to, those prepared under either low pressure, i.e., linear low density or high density polyethylene, or high pressure, i.e., branched or low density polyethylene. High-density polyethylenes are generally characterized by a density that is about equal to or greater than 0.94 grams per cubic centimeter (g/cc). Generally, high-density polyethylenes useful as the base resin in the present invention have a density ranging from about 0.94 g/cc to about 0.97 g/cc. The polyolefin can have a melt index, as measured at 2.16 kg and 190° C., ranging from about 0.005 decigrams per minute (dg/min) to 100 dg/min. Desirably, the polyolefin has a melt index of 0.01 dg/min to about 50 dg/min and more desirably of 0.05 dg/min to about 25 dg/min. Alternatively, mixtures of polyolefins, particularly polyethylenes can be used as the base polyolefin resin in producing the graft copolymer compositions of the present invention, and such mixtures should have a melt index greater than 0.005 dg/min to less than about 100 dg/min.

The low density polyethylene used as the polyolefin component in the following examples has a density of less than 0.94 g/cc and are usually in the range of 0.91 g/cc to about 0.93 g/cc. The low-density polyethylene has a melt index ranging from about 0.05 dg/min to about 100 dg/min and desirably from 0.05 dg/min to about 20 dg/min. Ultra low-density polyethylene can be used in accordance with the present invention. Generally, ultra low-density polyethylene has a density of less than 0.90 g/cc.

The above polyolefins can also be manufactured by using the well known multiple-site Ziegler-Natta catalysts or the more recent single-site metallocene catalysts. The metallocene catalyzed polyolefins have better controlled polymer microstructures than polyolefins manufactured using Ziegler-Natta catalysts, including narrower molecular weight distribution, well controlled chemical composition distribution, co-monomer sequence length distribution, and stereoregularity. Metallocene catalysts are known to polymerize propylene into atactic, isotactic, syndiotactic, isotactic-atactic stereoblock copolymer. Desirably, the polyolefin component of the compositions of the present invention is thermoplastic in order to facilitate the production of the compositions of the invention and to facilitate the processing of the compositions into articles, particularly, films.

Copolymers of ethylene which can be useful in the present invention may include, but are not limited to, copolymers of ethylene with one or more additional polymerizable, unsaturated monomers. Examples of such copolymers include, but are not limited to, copolymers of ethylene and alpha olefins (such as propylene, butene, hexene or octene) including linear low density polyethylene, copolymers of ethylene and vinyl esters of linear or branched carboxylic acids having 1–24 carbon atoms such as ethylene-vinyl acetate copolymers, and copolymers of ethylene and acrylic or methacrylic esters of linear, branched or cyclic alkanols having 1–28 carbon atoms. Examples of these latter copolymers include ethylene-alkyl (meth) acrylate copolymers, such as ethylene-methyl acrylate copolymers.

Poly(ethylene oxide) polymers suitable for the present invention include homopolymers and copolymers of ethylene oxide that are water soluble. The poly(ethylene oxide) component of the present invention can have molecular weights ranging from about 50,000 to about 8,000,000 grams per mol and, desirably, can range from about 100,000 to about 8,000,000 g/mol. More desirably, the average molecular weight of the poly(ethylene oxide) component of the present invention ranges from about 200,000 to about 6,000,000 g/mol. When the poly(ethylene oxide) component of the compositions of the present invention has a average molecular weight of less than 200,000 g/mol, the addition of the monomer and subsequent grafting of the monomer is not needed to get the desired phase inversion. In Example 4 below, the an inverse phase composition of poly(ethylene oxide) and polyolefin was achieved by melt blending 60 weight percent of a low density polyethylene and a 100,000 g/mol poly(ethylene oxide).

Suggested commercial examples of water-soluble poly (ethylene oxide) are available from Union Carbide Corporation under the trade name POLYOX®. Typically, poly (ethylene oxide) is a dry free flowing white powder having a crystalline melting point in the order of about 65° C., above which poly(ethylene oxide) resin becomes thermoplastic and can be formed by molding, extrusion and other methods known in the art.

The polyolefin and poly(ethylene oxide) components of compositions of the present invention have grafted thereto an effective amount of polar vinyl monomer. Grafting unexpectedly produces compositions and films having an inverse phase morphology. A variety of polar vinyl monomers may be useful in the practice of this invention. The term "monomer(s)" as used herein includes the traditional definition of a monomers as well as macromonomers which are oligomers and polymers capable of polymerization. As used herein monomers also include mixtures of monomers, oligomers and/or polymers as described above and any other reactive chemical species, which is capable of covalent bonding with the parent polymer(s). Ethylenically unsaturated monomers containing a polar functional group, such as hydroxyl, carboxyl, amino, carbonyl, halo, glycidyl, , cyano, thiol, sulfonic, sulfonate, etc. are appropriate for this invention and are suggested. Desired ethylenically unsaturated monomers include acrylates and methacrylates. Suggested polar vinyl monomers include, but are not limited to, 2-hydroxyethyl acrylate, 2-hydroxyethyl methacrylate, poly (ethylene glycol) acrylates, poly(ethylene glycol) methacrylates, poly(ethylene glycol) diacrylates, acrylic acid, methacrylic acid, maleic anhydride, itaconic acid, acrylamide, glycidyl methacrylate, 2-bromoethyl acrylate, 2-bromoethyl methacrylate, carboxyethyl acrylate, sodium acrylate, 3-hydroxypropyl methacrylate, 3-hydroxypropyl acrylate, 2-chloroacrylonitrile, 4-chlorophenyl acrylate, 2-cyanoethyl acrylate, glycidyl acrylate, 4-nitrophenyl acrylate, pentabromophenyl acrylate, poly(propylene glycol) acrylates, poly(propylene glycol) methacrylates, 2-propene-1-sulfonic acid and its sodium salt, 2-sulfoethyl acrylate, 2-sulfoethyl methacrylate, 3-sulfopropyl acrylate, 3-sulfopropyl methacrylate, and derivatives and analogs of the above. Suggested derivatives, include, but are not limited to, poly(ethylene glycol) ethyl ether acrylates, poly (ethylene glycol) alkyl ether acrylates, poly(ethylene glycol) alkyl ether methacrylates, and poly(ethylene glycol) ethyl ether methacrylates of various molecular weights.

Any polar vinyl monomer or a mixture of monomers including a polar vinyl monomer or monomers may be added to the reactive mixture of the component polymers with or separately from, the polymers during the blending process. The addition of a polar vinyl monomer and an initiator to the process is desirable when a poly(ethylene oxide) of molecular weight greater than about 100,000 grams per mol is used as the volume minority component of the inverse phase blend. The polymers and the monomer(s) may be added simultaneously. For example, the polymer, the initiator and the monomer(s) and may be added together into the hopper of the extruder, barrel #1. It is more desirable to add the polymers to the reactive vessel first and to melt the polymers before adding either the initiator or monomer. Examples of such methods include melting the polymers and then injecting a solution comprising initiator and monomer into the molten polymers; and adding the initiator and then adding the monomer or mixture of monomers to the molten polymers. It is even more desirable to add and disperse the monomer(s) in the molten polymers before adding the initiator. Thus, it is desired to add the polymers to the extruder first and then inject and disperse the monomer(s) in the polymers before adding initiator.

The compositions of the present invention may be by any of several methods. For example, the components, the polyolefin, poly(ethylene oxide), monomer and initiator can be premixed before heating blending to produce an inverse phase composition. Alternatively, the components may be added simultaneously or separately to a reaction vessel for melting and blending. Desirably, the polyolefin and poly (ethylene oxide) should be melt blended before adding monomer or initiator. The monomer and initiator may be added to the molten polymers separately or combined in a solution comprising the monomer and initiator. In a reactive extrusion process, it is desirable to feed the polyolefin and poly(ethylene oxide) into an extruder before adding monomer further down the extruder and adding initiator even further down the extruder. This sequence facilitates mixing of the monomer or mixture of monomers into the polymers before the initiator is added and radicals are created.

One skilled in the art would expect compositions comprising two or more dissimilar polymers such as a polyolefin and a water-soluble polymer such a poly(ethylene oxide) to form heterogeneous blends of the dissimilar polymers where the polymer component comprising the volume majority of the blend, greater than 50 volume percent, forms a continuous phase and the polymer component comprising the minority of the blend, less than 50 volume percent, forms the discontinuous or disperse phase of the blend. The discontinuous phase is also referred to as the disperse phase because it is dispersed in the continuous phase formed by the majority component. This is illustrated in FIG. 1. FIG. 1 is a scanning electron microscopic (SEM) photomicrograph of a back-scattered electron image of a cross-sectional view of a 4 mil (0.004 inch) film of Comparative Example A, a blend of 60 weight percent of ungrafted polyethylene, the darker phase shown in the photomicrograph, and 40 weight percent of an ungrafted poly(ethylene oxide), the lighter phase shown in the photomicrographs. Due to the density difference between polyethylene and poly(ethylene oxide), the volume percentage of polyethylene in the blend of Comparative Example 1 is about 67 percent and the volume percentage of poly(ethylene oxide) is only about 33 percent. In FIG. 1, it is observed that the volume majority component of the blend, the darker polyethylene, forms the continuous phase and the volume minority component of the blend, the lighter poly(ethylene oxide), forms the discontinuous/ disperse phase.

In contrast, the volume minority component of the compositions of the present invention forms a continuous phase and the volume majority component forms a discontinuous phase. This is illustrated in FIGS. 2–8. FIGS. 2–8 include scanning electron microscopic photomicrographs of back-scattered electron images of cross-sectional and topographical views by secondary electron images of 4 mil films of Examples 1, 2, 3, 11 and 13. As can be observed from the photomicrographs, the compositions of the present invention comprise a volume majority of a polyolefin and a volume minority of poly(ethylene oxide) yet exhibit inverse phase morphology. Specifically, poly(ethylene oxide) which is the minority component of the compositions of the Examples appears as the lighter phase in the photomicrographs is the continuous phase even though the poly(ethylene oxide) is the volume minority component of the compositions and comprises less than half of the volume of the compositions of the present invention. The majority component, the darker polyolefin phase, is discontinuous and forms the disperse phase in the compositions of the present invention. Thus, compositions and films of the present invention have a poly(ethylene oxide) as the continuous phase and a polyolefin as the discontinuous phase notwithstanding that there is a significantly greater amount of polyolefin. For example, many of the inverse phase compositions demonstrated herein have a volume ratio of polyolefin to poly(ethylene oxide) of about 2 to 1.

The amount of polar vinyl monomer grafted onto the polyolefin and poly(ethylene oxide) can vary and may range from a total of from about 0.1 weight percent to about 30 weight percent, based on the sum of the weight of the polyolefin and the poly(ethylene oxide). Desirably, the polyolefin and poly(ethylene oxide) have a total of from about 1 weight percent to about 20 weight percent of monomer grafted thereto. More desirably, the polyolefin and poly (ethylene oxide) have a total of from about 1 weight percent to about 10 weight percent of monomer grafted thereto. It is believed that the polar groups of the grafted polar vinyl monomer reduce the interfacial tension between the poly (ethylene oxide) phase and the polyolefin phase. The reduction in interfacial tension is believed to stabilize the polyolefin phase and allow the polyolefin to exist as the dispersed phase in the blend with poly(ethylene oxide).

To prepare the compositions of the present invention, a polyolefin and a poly(ethylene oxide) are reacted with a monomer in the presence of a free radical initiator. The initiator serves to initiate free radical grafting of the monomer onto the polyolefin and poly(ethylene oxide). One method of grafting the polymer blends includes melt blending the desired volume or weight ratio of a mixture of the polyolefin and a poly(ethylene oxide) and adding a monomer and a free radical initiator in an extruder and at a reaction temperature where the polyolefin and poly(ethylene oxide) are converted to a molten state. Accordingly, a preferred method includes adding the polyolefin, poly (ethylene oxide), monomer and free radical initiator simultaneously to the extruder before the polymer constituents, i.e., the polyolefin and poly(ethylene oxide) have been melted. Desirably, the melt extruder used for melt blending can introduce various constituents into the blend at different locations along the screw length. For example, a polar vinyl monomer and initiator can be injected into the blend before or after one or more of the polymer constituents is melted or thoroughly mixed. More preferably, a polyolefin and poly (ethylene oxide) are added at the beginning of the extruder and polar vinyl monomer is added to melted polymers further down the extruder barrel, a free radical initiator is also fed to the melt blend. Methods of making blends are described in U.S. patent application Ser. No. 08/777,226 filed on Dec. 31, 1996 and entitled "BLENDS OF POLYOLEFIN AND POLY(ETHYLENE OXIDE) AND PROCESS FOR MAKING THE BLENDS", now U.S. Pat. No. 5,700,872, the entire disclosure of which is incorporated herein by reference.

In one embodiment of the invention, the method of making the compositions is achieved by reactive blending, desirably by a reactive extrusion process. The compositions of the present invention may be made by a batch blending process or a continuous process. For example, desired amounts of polyolefin, poly(ethylene oxide), monomer and initiator may be combined in a vessel and heated and mixed to graft monomer onto the polyolefin and poly(ethylene oxide) and form an inverse phase composition. Another method of making the compositions of the present invention includes melt blending desired amounts of polyolefin and poly(ethylene oxide) in an extruder. In an extruder, monomer and initiator may be added to the polyolefin and poly(ethylene oxide) contemporaneously with the polymers as they are fed into the extruder, after the polymers are fed into the extruder and even between the separate feeding of the polymers into the extruder. Desirably, the inverse phase compositions are pelletized. The extruded pellets have the desired inverse phase morphology and can be processed into various articles, including but not limited to films having inverse phase morphology.

The extruded compositions can be used to manufacture various articles including pellets for later use and further processing. Desirably, the compositions of the present invention can be used to manufacture films and other articles that may be flushable, water sensitive, water responsive, water dispersible or water soluble, depending of the needs of the manufacturer. Generally, flushability, water sensitivity, water responsiveness, water dispersablity and water solubility of compositions, films and articles can be increased by increasing the ratio of water-soluble component, poly (ethylene oxide). The compositions of the present invention are amenable to melt processing and conventional thermoplastic processing techniques. Films can be made from compositions using casting, blowing, and compression molding processes.

Processes used to make non-woven fabrics from extruded films of compositions of the present invention are described in greater detail in U.S. patent application Ser. Nos. 09/001, 781 and 09/001,791 the entire disclosures of which is incorporated herein by reference. In one embodiment of the process of making non-woven fabrics, a film of an inverse phase blend is extruded and exposed to water. The water washes away and removes most of the water-soluble poly (ethylene oxide) leaving a non-woven web of polyolefin. The non-woven web of polyolefin may be a HEMA-grafted-polyolefin or PEGMA-grafted-polyolefin web. The non-woven web has been observed to be soft, very drapeable and "silk" like in texture. The non-woven fabric is also wettable and has desirable wicking and water spreading properties that are desirable for many personal care applications. For example, the non-woven fabric may be used as a liner material in diapers, feminine pads and pantiliners.

A variety of vessels may be used in the practice of this invention. The inverse phase modification of the polymers can be performed in any vessel as long as the necessary mixing of the polymers, monomer and initiator is achieved and enough thermal energy is provided to effect grafting. Desirably, such vessels include any suitable mixing device, such as Bradender Plasticorders, Haake extruders, single or multiple screw extruders, or any other mechanical mixing devices which can be used to mix, compound, process or fabricate polymers. In a desired embodiment, the reaction device is a counter-rotating twin-screw extruder, such as a Haake extruder available from Haake, 53 West Century Road, Paramus, N.J. 07652 or a co-rotating, twin-screw extruder, such as a ZSK-30 twin-screw, compounding extruder manufactured by Werner & Pfleiderer Corporation of Ramsey, N.J. It should be noted that a variety of extruders can be used to combine the component polymers in accordance with the invention provided that mixing and heating occur.

Free radical initiators which can be used to graft the monomer onto the polyolefin include, but are not limited to, acyl peroxides such as benzoyl peroxide; dialkyl; diaryl; or aralkyl peroxides such as di-t-butyl peroxide; dicumyl peroxide; cumyl butyl peroxide; 1,1-di-t-butyl peroxy-3,5,5-trimethylcyclohexane; 2,5-dimethyl-2,5-di(t-butylperoxy) hexane; 2,5-dimethyl-2,5-bis(t-butylperoxy) hexyne-3 and bis(a-t-butyl peroxyisopropylbenzene); peroxyesters such as t-butyl peroxypivalate; t-butyl peroctoate; t-butyl perbenzoate; 2,5-dimethylhexyl-2, 5-di(perbenzoate); t-butyl di(perphthalate); dialkyl peroxymonocarbonates and peroxydicarbonates; hydroperoxides such as t-butyl hydroperoxide, p-methane hydroperoxide, pinane hydroperoxide and cumene hydroperoxide and ketone peroxides such as cyclohexanone peroxide and methyl ethyl ketone peroxide. Azo compounds such as azobisisobutyronitrile may also be used as an initiator for grafting in the present invention.

The amount of free radical initiator added to the polyolefin and poly(ethylene oxide) should be an amount sufficient to graft from about 1 percent to 100 percent of the polar vinyl monomer onto the polyolefin and poly(ethylene oxide). The amount of initiator can vary and should range from about 0.05 weight percent to about 1 weight percent, desirably, from about 0.1 weight percent to about 0.75 weight percent and, more desirably, from about 0.1 weight percent to about 0.5 weight percent. The above weight ranges are based on the weight of initiator added to the total combined weight of polyolefin and poly(ethylene oxide) used to produce the composition.

Characteristic of the invention, a film when viewed using a scanning electron microscope and using back-scattered electron detector images shows that the poly(ethylene oxide) forms the continuous phase wherein the polyolefin is in a discontinuous phase, that is, dispersed throughout the poly (ethylene oxide) phase. Back-scattered electron detector imaging produces an image wherein the higher average atomic number constituent produces a higher intensity of back-scattered electrons that appear brighter in the photographic image. A constituent having a lower atomic number produces a lower intensity of back-scattered electrons that appear as darker images in the photograph. Back-scattered electron microscope imaging is described in greater detail in Linda C. Sawyer and David T. Grubb, *Polymer Microscopy*, Chapman & Hall, London, 1987, p. 25. Desirably, the polyolefin portions of the thermoplastic film have an average cross-sectional diameter ranging from about 0.1 microns to about 50 microns, preferably from about 0.5 microns to about 30 microns and more preferably from about 0.5 microns to about 25 microns. Such "polyolefin portions" can be solidified pockets of polyolefin, fibers or combinations thereof.

The present invention is illustrated in greater detail by the specific examples presented below. It is to be understood that these examples are illustrative embodiments and are not intended to be limiting of the invention, but rather are to be construed broadly within the scope and content of the appended claims.

COMPARATIVE EXAMPLE A

A 60/40 weight percent resin mixture of low-density polyethylene and poly(ethylene oxide) (hereinafter abbreviated as PEO) was melt blended using an extruder. The low-density polyethylene had a melt index of 1.9 decigrams per minute (dg/min) and a density of 0.917 grams per cubic centimeter (g/cc) (Dow 503I; available from Dow Chemical Company, Midland, Mich.). The PEO had a molecular weight of 200,000 g/mol (POLYOX® WSRN-80; available from Union Carbide Corp.). The extruder used for making the blend was a Werner & Pfleiderer ZSK-30 extruder (available from Werner & Pfleiderer Corporation, Ramsey, N.J.). The resin blend was fed to the extruder at a rate of 34 pounds per hour. The extruder had a pair of co-rotating screws arranged in parallel. The center distance between the two shafts was 26.2 mm. The nominal screw diameter was 30 mm. The actual outer screw diameter was 30 mm. The inner screw diameter was 21.3 mm. The thread depth was 4.7 mm. The extruder had 14 processing barrels, with 13 heated barrels divided into 7 heating zones. The overall processing length was 1340 mm. The seven heating zones were all set at 180 degrees Centigrade (° C.). The screw speed was set at 300 rpm.

All films of the melt blends in this Comparative Example and Examples 1–9 were made using a Haake counter-rotating twin screw extruder (available from Haake, 53 West Century Road, Paramus, N.J., 07652) equipped with a four inch slit die. The extruder had a length of 300 millimeters. The conical screws had 30 millimeters diameter at the feed port and a diameter of 20 millimeters at the die. The extruder had four heating zones set at 170, 180, 180 and 190° C. The screw speed was 30 rpm. A chilled wind-up roll was used to collect the film. The chilled roll was operated at a speed sufficient to form a film having a thickness of about 4 mils (about 0.004 of an inch) and was maintained at a temperature of 15–20° C.

Referring to FIG. 1, the polyethylene formed the continuous phase and the poly(ethylene oxide) formed the discontinuous phase.

Examples 1–3

In accordance with the invention, a 60/40 weight percent resin blend of low-density polyethylene (LDPE) and poly (ethylene oxide), as described above in the Comparative Example, was fed to the ZSK-30 extruder at a rate of 34 lb/hr. The seven heating zones were all set at 180° C. The screw speed was 300 rpm. At barrel 4 of the extruder, a monomer, poly(ethylene glycol) ethyl ether methacrylate (PEG-MA; available from Aldrich Chemical Company, Milwaukee, Wis.), was added at the specified rate. At barrel 5 of the extruder, a free radical initiator (2,5-dimethyl-2,5-di(t-butylperoxy) hexane, supplied by Atochem, 2000 Market St., Philadelphia, Pa. under the tradename Lupersol 101) was added at the specified rate.

For Example 1, the PEG-MA feed rate was 1.0 lb/hr and the initiator rate was 0.068 lb/hr.

For Example 2, the PEG-MA feed rate was 1.9 lb/hr and the initiator rate was 0.068 lb/hr. For Example 3, the PEG-MA feed rate was 3.1 lb/hr and the initiator rate was 0.17 lb/hr.

Figure 2:
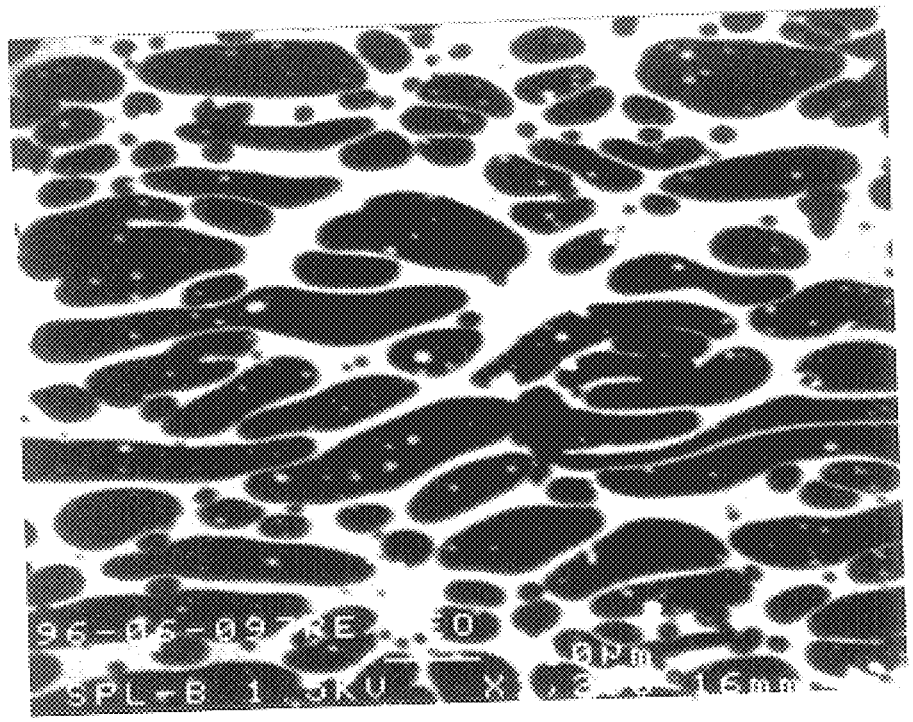
FIG. 2 is a SEM photomicrograph of a back-scattered electron image of a cross-sectional view of a 4 mil film from the composition of Example 1, an inverse phase blend of 60 weight percent LDPE and 40 weight PEO that are grafted with about 3 weight percent of PEGMA.
Figure 3:
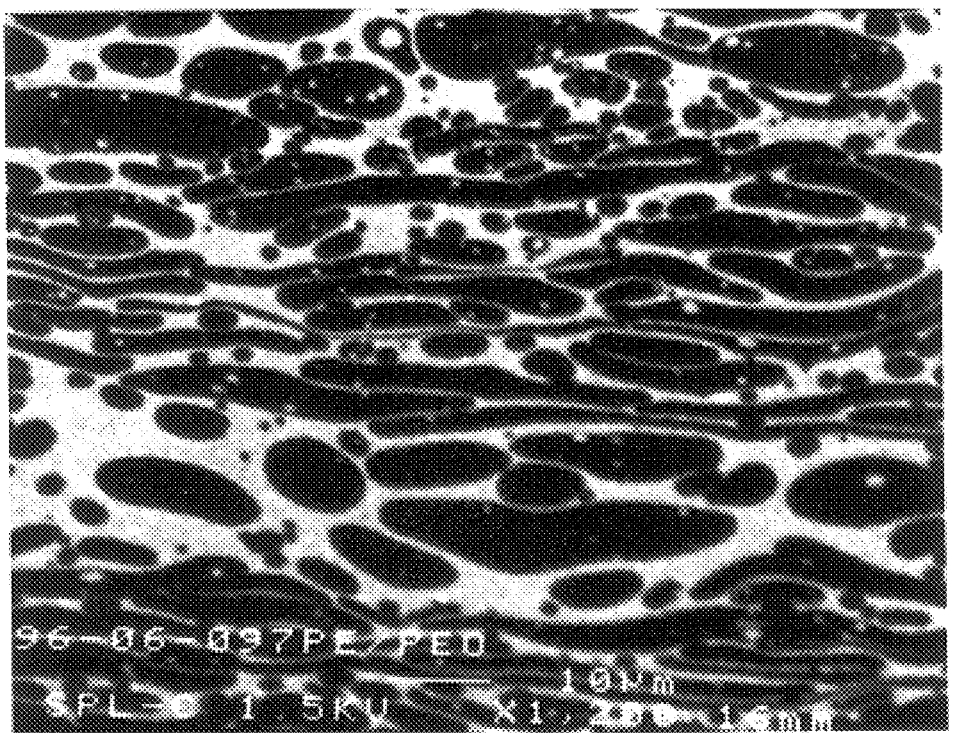
FIG. 3 is a SEM photomicrograph of a back-scattered electron image of a cross-sectional view of a 4 mil from the composition of Example 2, an inverse phase blend of 60 weight percent LDPE and 40 weight percent PEO that are grafted with about 5.5 weight percent of PEGMA monomer.
Figure 4:
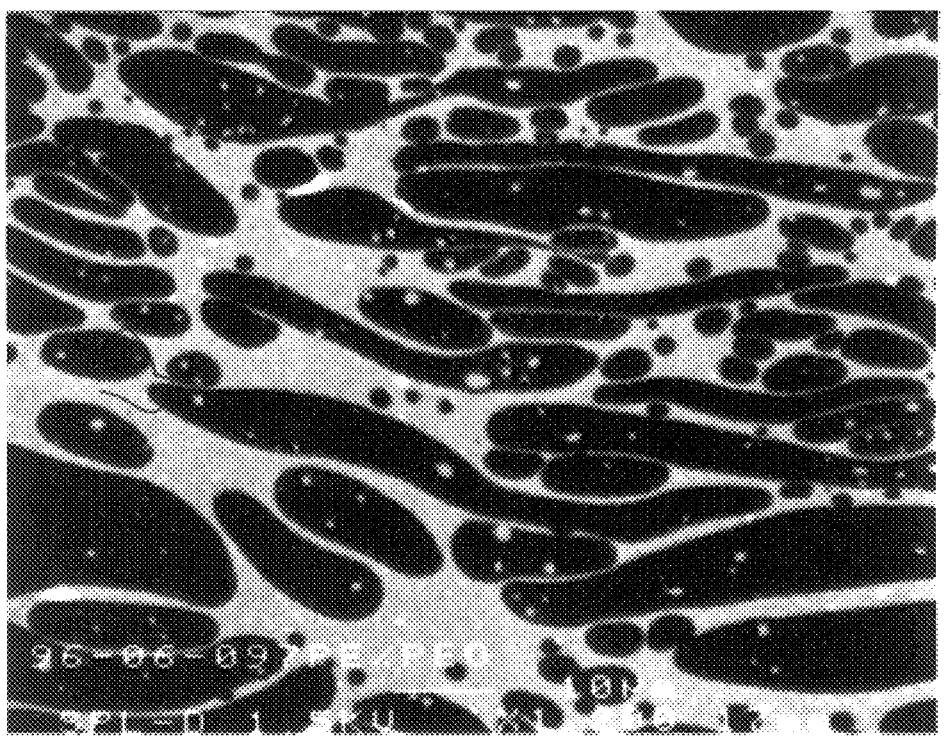
FIG. 4 is a SEM photomicrograph of a back-scattered electron image of a cross-sectional view of a 4 mil film from the composition of Example 3, an inverse phase blend of 60 weight percent LDPE and 40 weight percent PEO that are grafted with about 9 weight percent of PEGMA monomer.
Figure 5:
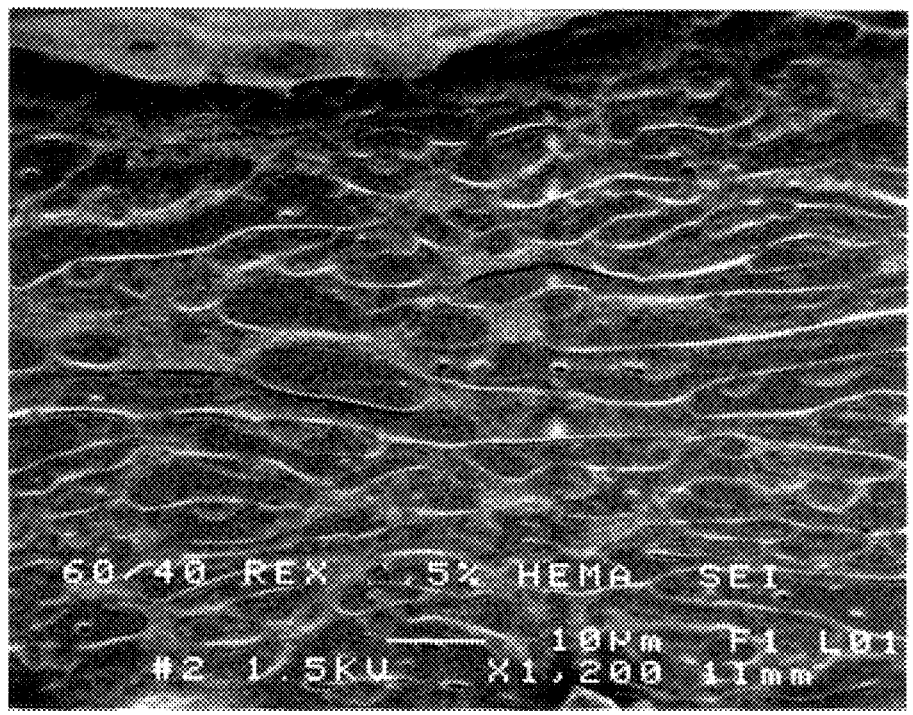
FIG. 5 is a SEM photomicrograph of a secondary electron image of a topological view of a 4 mil film from the composition of Example 11, an inverse phase blend of 60 weight percent LDPE and 40 weight percent PEO that are grafted with about 5 weight percent of HEMA monomer.
Figure 6:
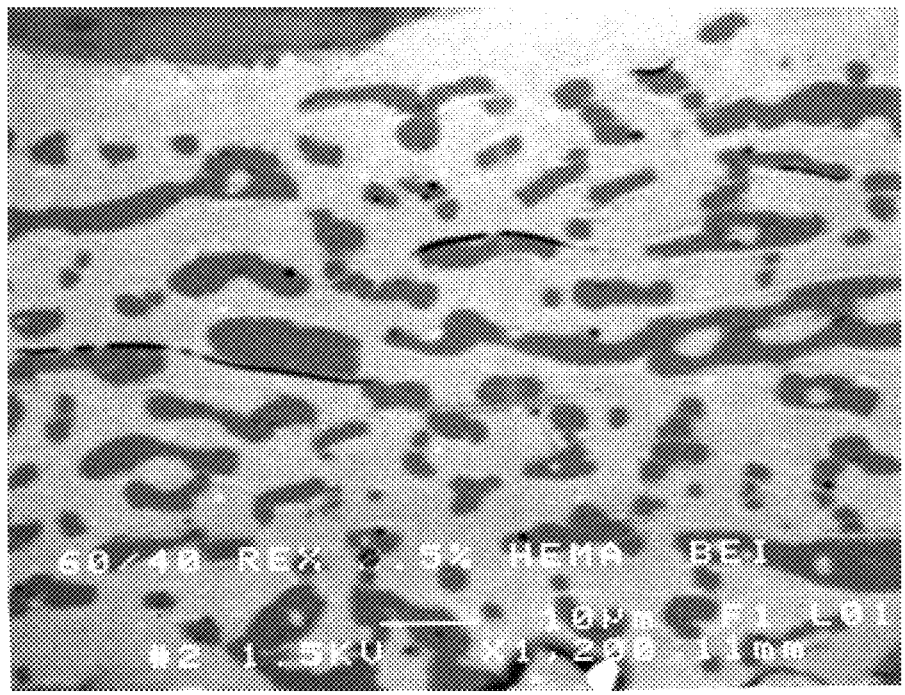
FIG. 6 is a SEM photomicrograph of a back-scattered electron image of a cross-sectional view of a 4 mil film from the composition of Example 11, an inverse phase blend of 60 weight percent LDPE and 40 weight percent PEO that are grafted with about 5 weight percent of HEMA monomer.
Figure 7:
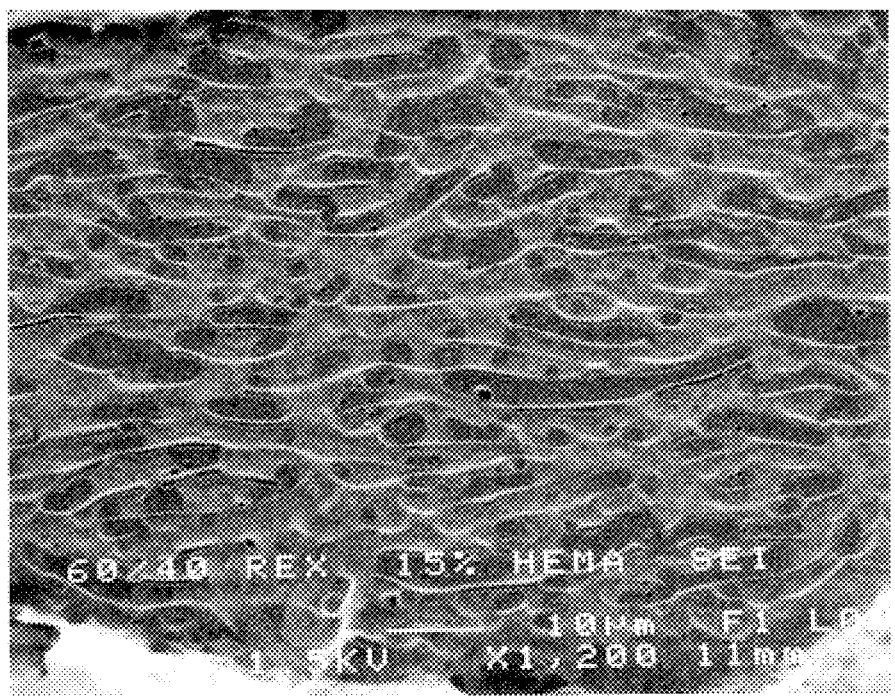
FIG. 7 is a SEM photomicrograph of a secondary electron image of a topological view of a 4 mil film from the composition of Example 13, an inverse phase blend of 60 weight percent LDPE and 40 weight percent PEO that are grafted with about 15 weight percent of HEMA monomer.
Figure 8:
FIG. 8 is a SEM photomicrograph of a back-scattered electron image of a cross-sectional view of a 4 mil film from the composition of Example 13, an inverse phase blend of 60 weight percent LDPE and 40 weight percent PEO that are grafted with about 15 weight percent of HEMA monomer.

Referring to FIGS. 2–4, the thermoplastic film of the invention exhibited inverse phase morphology. The inverse phase compositions and films of Examples 1–3 comprise a minor amount/volume of poly(ethylene oxide) as the continuous phase and a major/volume amount polyolefin as the disperse phase. Particularly, Examples 1–3 are believed to comprise a continuous phase of PEGMA-g-PEO and a discontinuous phase of PEGMA-g-LDPE.

Example 4

A 60/40 weight percent resin blend of low density polyethylene (Dow 503I) and poly(ethylene oxide) having a molecular weight of 100,000 g/mol (POLYOX® WSRN-10) was fed to the ZSK-30 extruder at a rate of 35 lb/hr. The seven heating zones were all set at 180° C. The screw speed was 300 rpm. A film of the melt blended resin exhibited an inverse phase morphology having the poly(ethylene oxide) as the continuous phase and the polyethylene as the discontinuous phase.

Examples 5–9

A resin blend having a 60/40 weight ratio of low density polyethylene (Dow 503I) and poly(ethylene oxide) (POLYOX® WSRN-80) was fed to a Haake extruder at 5.0 lb/hr. The Haake extruder was similar to that described above in the Comparative Example except the extruder included a two-hole strand die instead of the four inch slit die. Simultaneously with the polymer feed to the extruder, specified amounts of the monomer, PEG-MA, and free radical initiator (Lupersol 101) were added at the feed throat. The extruder had four heating zones set at 170, 180, 180, and 190° C. The screw speed of the extruder was 150 rpm. The strands were cooled in air and pelletized.

For Example 5 the blend was 60/40 PE/PEO, the PEG-MA feed rate was 0.50 lb/hr and the initiator rate was 0.025 lb/hr.

For Example 6 the blend was 65/35 PE/PEO, the PEG-MA feed rate was 0.50 lb/hr and the initiator rate was 0.025 lb/hr.

For Example 7 the blend was 70/30 PE/PEO, the PEG-MA feed rate was 0.50 lb/hr and the initiator rate was 0.025 lb/hr.

For Example 8 the blend was 75/25 PE/PEO, the PEG-MA feed rate was 0.50 lb/hr and the initiator rate was 0.025 lb/hr.

For Example 9 the blend was 80/20 PE/PEO, the PEG-MA feed rate was 0.50 lb/hr and the initiator rate was 0.025 lb/hr.

The films and compositions of Examples 5–9 exhibit inverse phase morphology having a polar vinyl monomer grafted poly(ethylene oxide) as the continuous phase and a polar vinyl monomer grafted polyolefin as the discontinuous phase.

For Example 5, the amount of monomer grafted onto the poly(ethylene oxide) was determined, by proton NMR spectroscopy in deuterated water, to be 9.52 weight percent based on the amount of poly(ethylene oxide) in the blend. The amount of unreacted monomer was determined, by proton nuclear magnetic resonance (NMR) spectroscopy in deuterated water, to be 2.02 weight percent based on the amount of polyethylene and poly(ethylene oxide) in the blend. The amount of monomer grafted onto the polyethylene was determined to be 0.51 weight percent by Fourier-Transform Infrared (FT-IR) and oxygen content analysis as described in copending U.S. patent application Ser. No. 08/733,410 filed Oct. 18, 1996 the entire disclosure of which is incorporated herein by reference.

Examples 10–13

In accordance with the invention, a 60/40 weight percent resin blend of low density polyethylene and poly(ethylene oxide), as described above in Comparative Example A, was fed to the ZSK-30 extruder at a rate of 34 lb/hr. The seven heating zones were all set at 180° C. The screw speed was 300 rpm. At barrel 4 of the extruder, a monomer, 2-hydroxyethyl methacrylate (abbreviated as HEMA; commercially available from Aldrich Chemical Company of Milwaukee, Wis.), was added at the specified rate. At barrel 5 of the extruder, a free radical initiator was added at the specified rate. The free radical initiator used in the following examples was 2,5-dimethyl-2,5-di(t-butylperoxy) hexane and is commercially available from Atochem of Philadelphia, Pa. under the tradename Lupersol 101.

For Example 10, the HEMA feed rate was 0.75 lb/hr and the initiator rate was 0.068 lb/hr.

For Example 11, the HEMA feed rate was 1.5 lb/hr and the initiator rate was 0.068 lb/hr.

For Example 12, the HEMA feed rate was 3 lb/hr and the initiator rate was 0.068 lb/hr.

For Example 13, the HEMA feed rate was 4.5 lb/hr and the initiator rate was 0.17 lb/hr.

Referring to FIGS. 5-8, films of 60/40 HEMA grafted LDPE/PEO exhibited inverse phase morphology having HEMA-g-PEO as the continuous phase and HEMA-g-LDPE as the discontinuous phase.

The dry and wet mechanical properties of films from the four 60/40 PE/PEO of Examples 10–13 and Comparative Example A were determined and are presented in Table 1 below. The thickness of the tested films were measure and reported in thousandths of an inch. The elongation-at-break or strain-at-break of the tested films were measured and are reported as a percentage. The peak stress or tensile strength of the tested films was measured and is reported in units of MPa. The energy-to-break or toughness of the tested films was measure and is reported in units of $MJ/m^3$. And, the modulus or rigidity of the tested films was measured and is reported in units of MPa.

Figure 14:
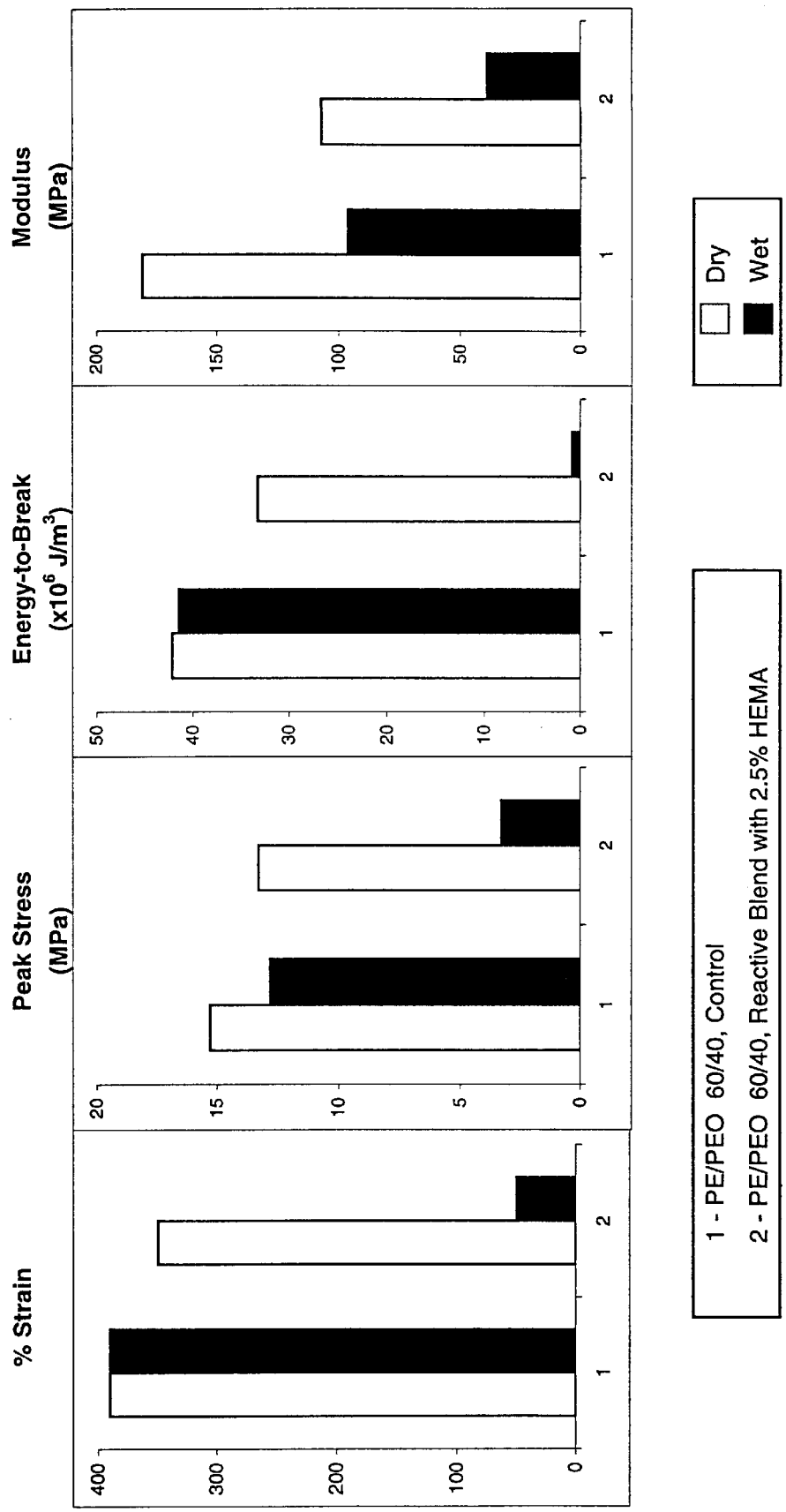
FIG. 14 is a bar graph comparing the wet and dry mechanical properties of a film of the inverse phase composition of Example 10 versus the wet and dry mechanical properties of a film of the non-inverse phase composition of Comparative Example A.

Other mechanical properties of the films were measured before exposure to water (dry) and after exposure to water (wet). From dry to wet, the percentages in loss of mechanical properties for the film of Example 10 in strain (elongation-at-break), strength (peak stress), toughness (energy-to-break), and rigidity (modulus) are 86%, 75%, 97% and 64%, respectively. The bar chart of FIG. 14 gives illustrates a comparison of the mechanical properties of dry and wet films of Example 10 versus Comparative Example A. Such decreases in mechanical properties after exposure to water are desirable in many flushable applications. Additionally, the film of Example 10 was observed to wettable by water and the surface of the film became slimy when submerged in water.

Figure 11:
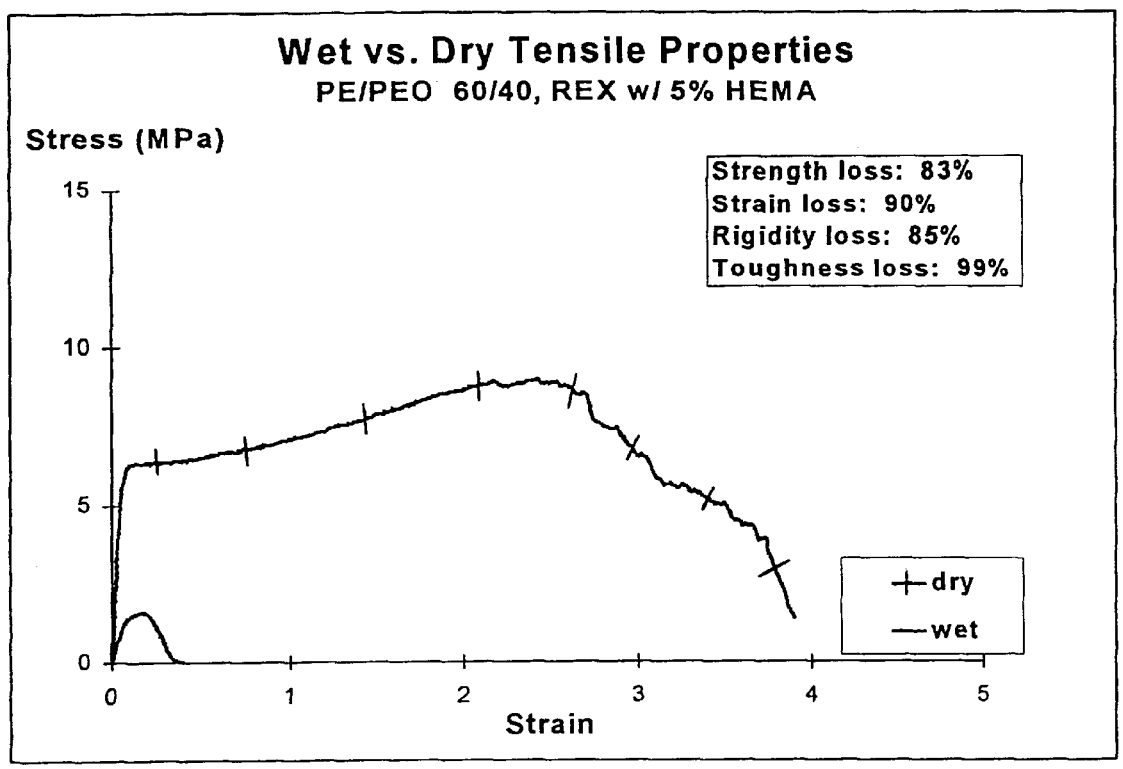
FIG. 11 is a graph illustrating the wet and dry tensile curves of a film of the inverse phase composition of Example 11.
Figure 12:
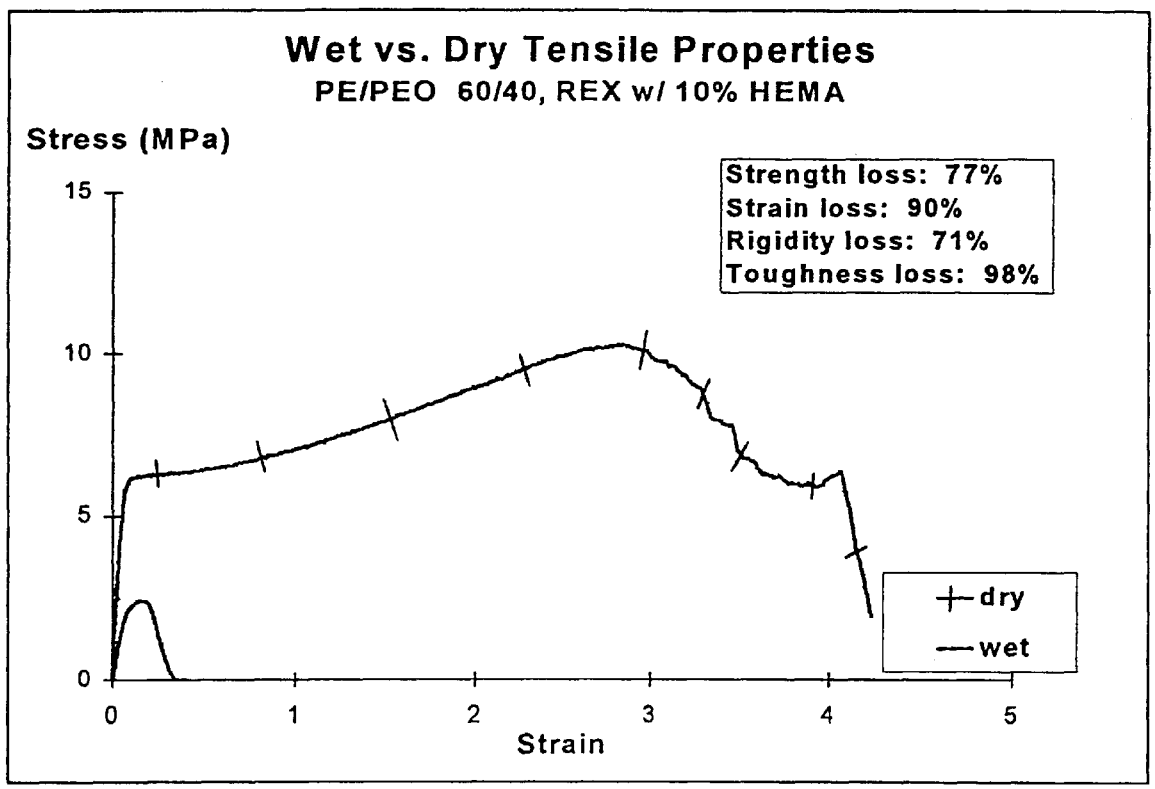
FIG. 12 is a graph illustrating the wet and dry tensile curves of a film of the inverse phase composition of Example 12.
Figure 13:
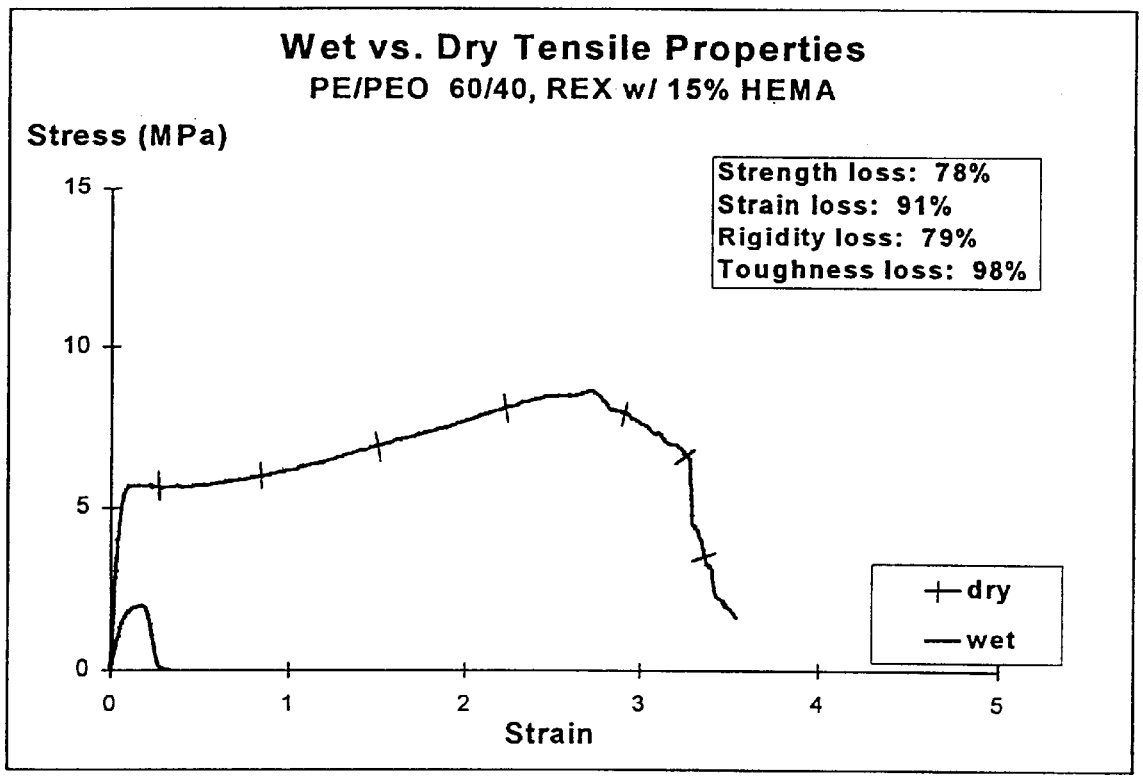
FIG. 13 is a graph illustrating the wet and dry tensile curves of a film of the inverse phase composition of Example 13.
Figure 15:
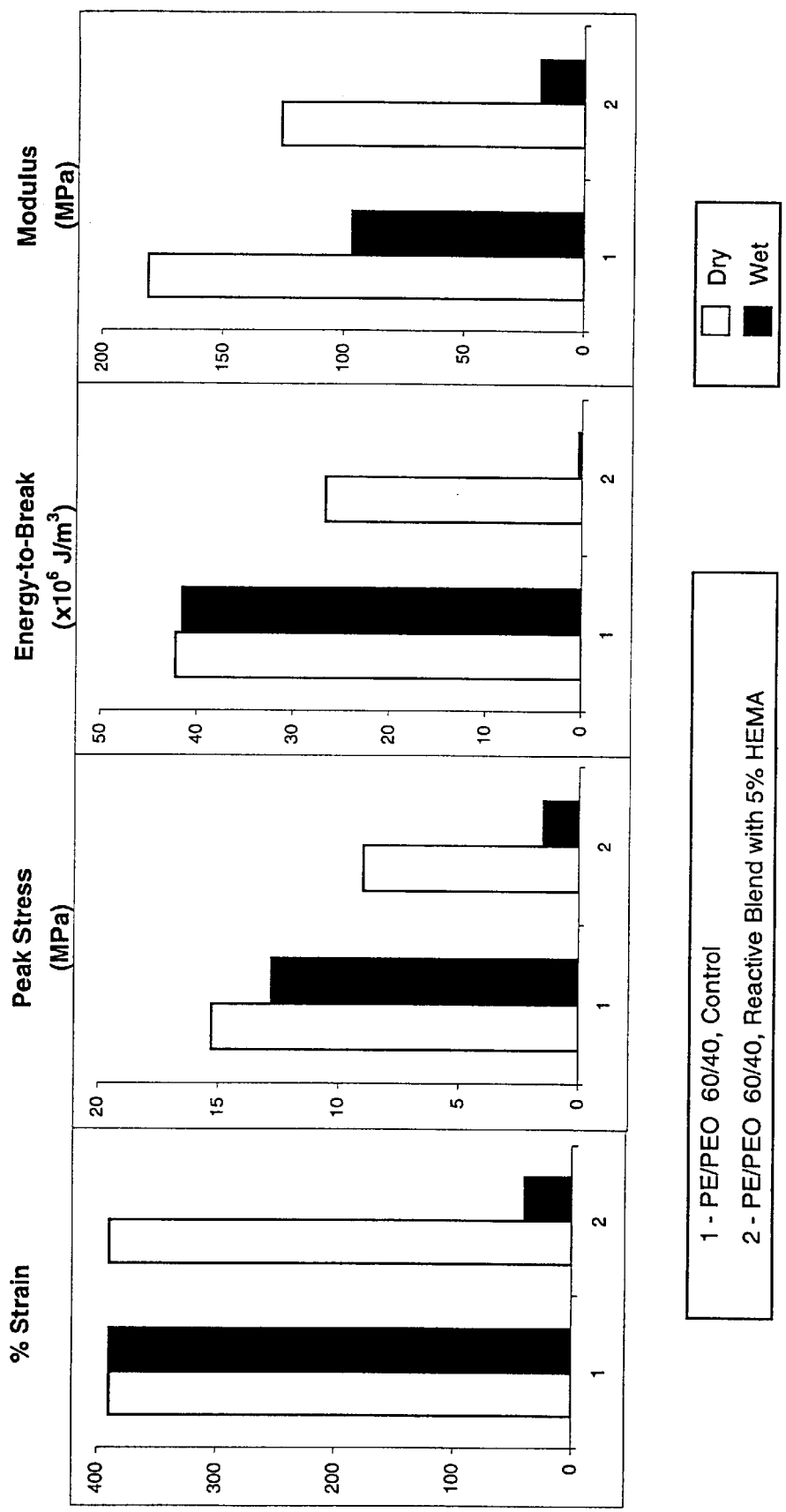
FIG. 15 is a bar graph comparing the wet and dry mechanical properties of a film of the inverse phase composition of Example 10 versus the wet and dry mechanical properties of a film of the non-inverse phase composition of Comparative Example A.
Figure 16:
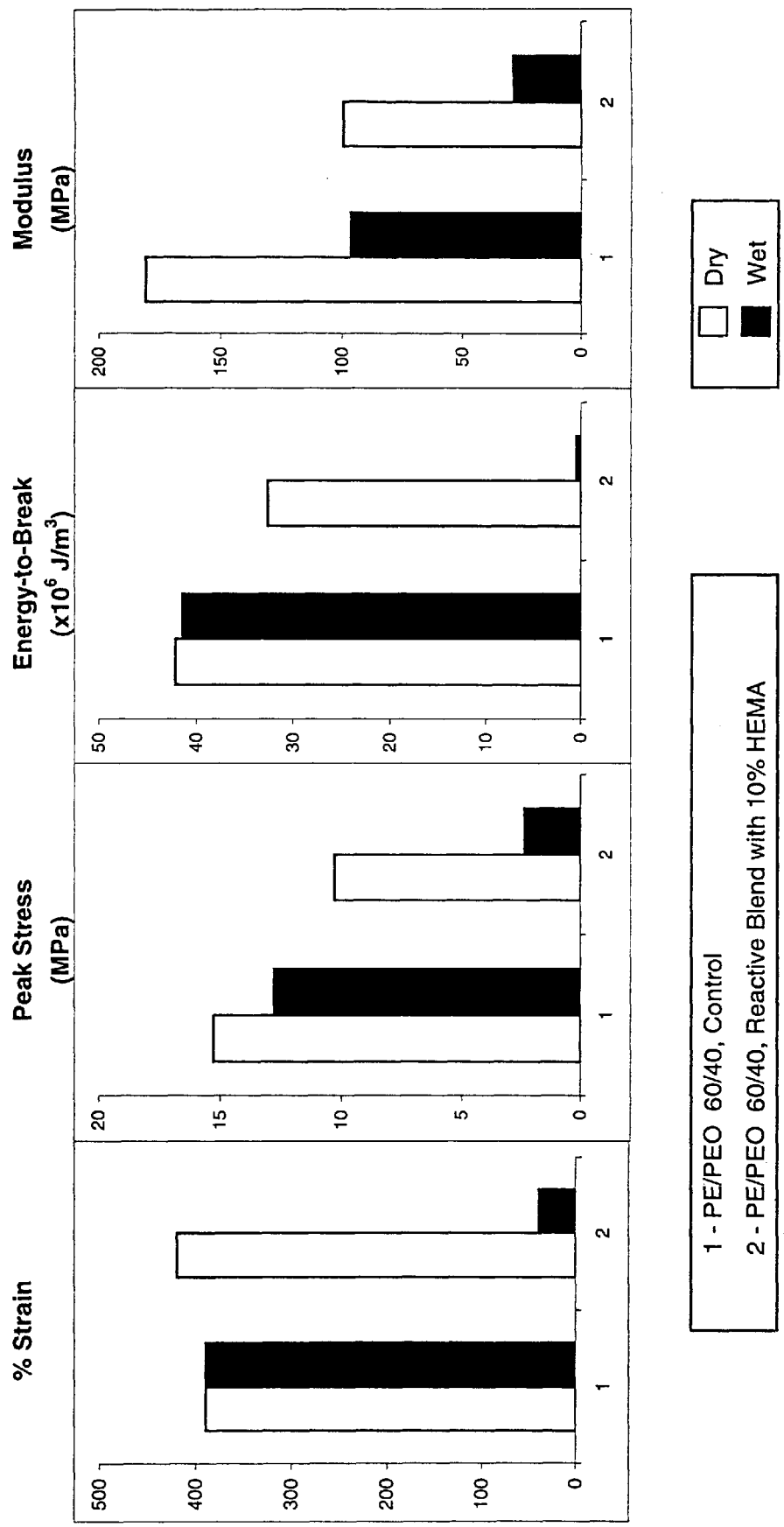
FIG. 16 is a bar graph comparing the wet and dry mechanical properties of a film of the inverse phase composition of Example 12 versus the wet and dry mechanical properties of a film of the non-inverse phase composition of Comparative Example A.
Figure 17:
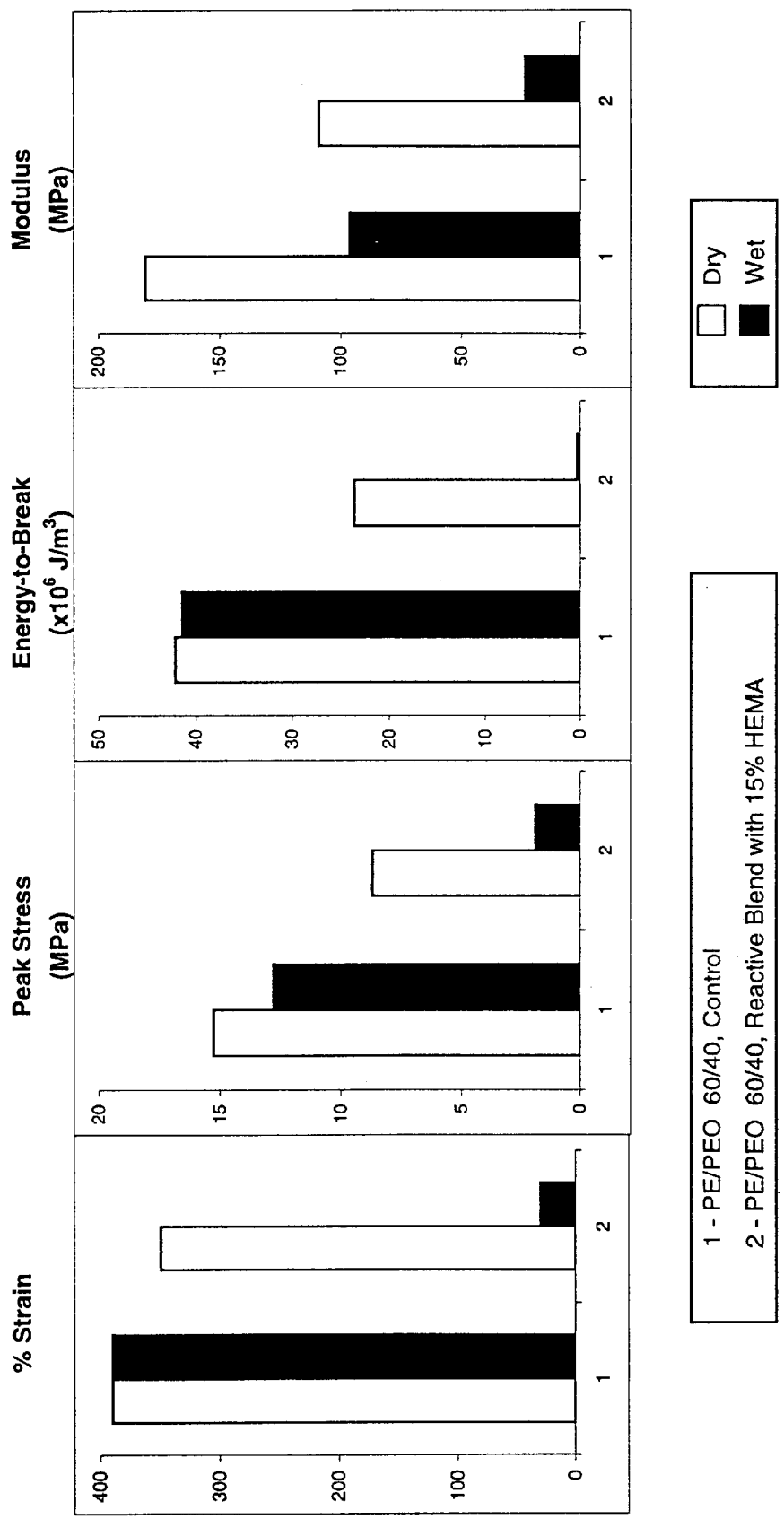
FIG. 17 is a bar graph comparing the wet and dry mechanical properties of a film of the inverse phase composition of Example 13 versus the wet and dry mechanical properties of a film of the non-inverse phase composition of Comparative Example A.

The dry and wet tensile curves for the inverse phase blends of Examples 11, 12 and 13 are shown in FIGS. 11, 12 and 13, respectively. Similarly, comparison bar charts comparing the mechanical properties of wet and dry films of Examples 15, 16 and 17 versus Comparative Example A are illustrated in FIGS. 15, 16 and 17.

TABLE 1

Dry and Wet Tensile Properties

| Example No. | A | | 10 | | 11 | | 12 | | 13 | |
|---|---|---|---|---|---|---|---|---|---|---|
| Tested Condition | DRY | WET | DRY | WET | DRY | WET | DRY | WET | DRY | WET |
| Thickness of film | 4.5 | 4.4 | 4.5 | 4.6 | 4.2 | 4.7 | 4.5 | 4.5 | 5.0 | 4.6 |
| Elongation-at-Break | 650 | 650 | 580 | 80 | 650 | 70 | 700 | 70 | 580 | 50 |
| Peak Stress | 15.3 | 12.8 | 13.3 | 3.3 | 9.0 | 1.5 | 10.3 | 2.4 | 8.7 | 1.9 |
| Energy-to-Break | 70.3 | 69.2 | 55.5 | 1.5 | 44.5 | 0.6 | 54.5 | 0.9 | 39.2 | 0.6 |
| Modulus | 109 | 58 | 64 | 23 | 76 | 11 | 60 | 17 | 65 | 14 |
| Percentage Loss in Measured Property from Dry to Wet | | | | | | | | | | |
| Elongation-at-Break | 0% | | 86% | | 90% | | 90% | | 91% | |
| Peak Stress | 16% | | 75% | | 83% | | 77% | | 78% | |
| Energy-to-break | 2% | | 97% | | 99% | | 98% | | 98% | |
| Modulus | 47% | | 64% | | 85% | | 71% | | 79% | |

Films comprising compositions of the present invention are wettable and lose a significant portion of their water-soluble component, poly(ethylene oxide), with exposure to water or aqueous solutions. Consequently, such films lose most of their mechanical properties when exposed to water and possess only a small fraction of their dry mechanical properties. The decrease in mechanical properties of wet films of the present invention, Examples 10–13, versus dry films is illustrated in Table 1 above. Films of the present invention have dry properties comparable to non-inverse phase films of the same polyolefin and poly(ethylene oxide) content but have wet properties significantly less than films of non-inverse phase morphology.

Figure 9:
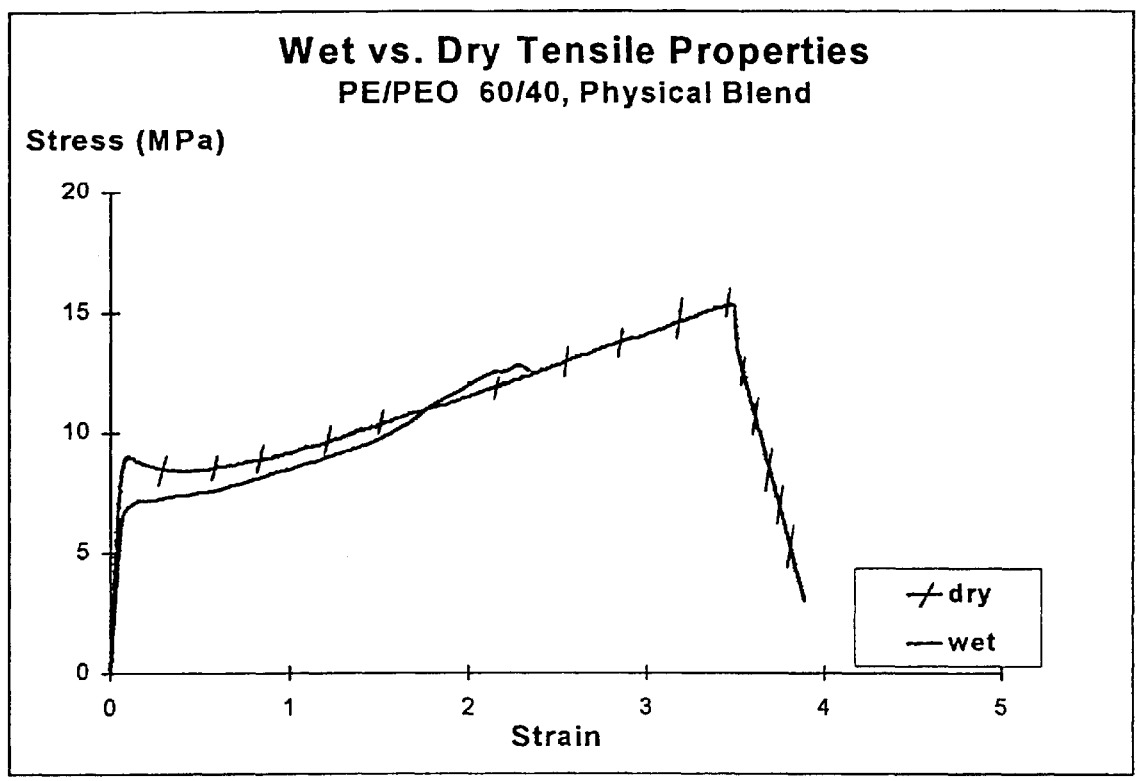
FIG. 9 is a graph illustrating the wet and dry tensile curves of a film of the non-inverse phase composition of Comparative Example A.
Figure 10:
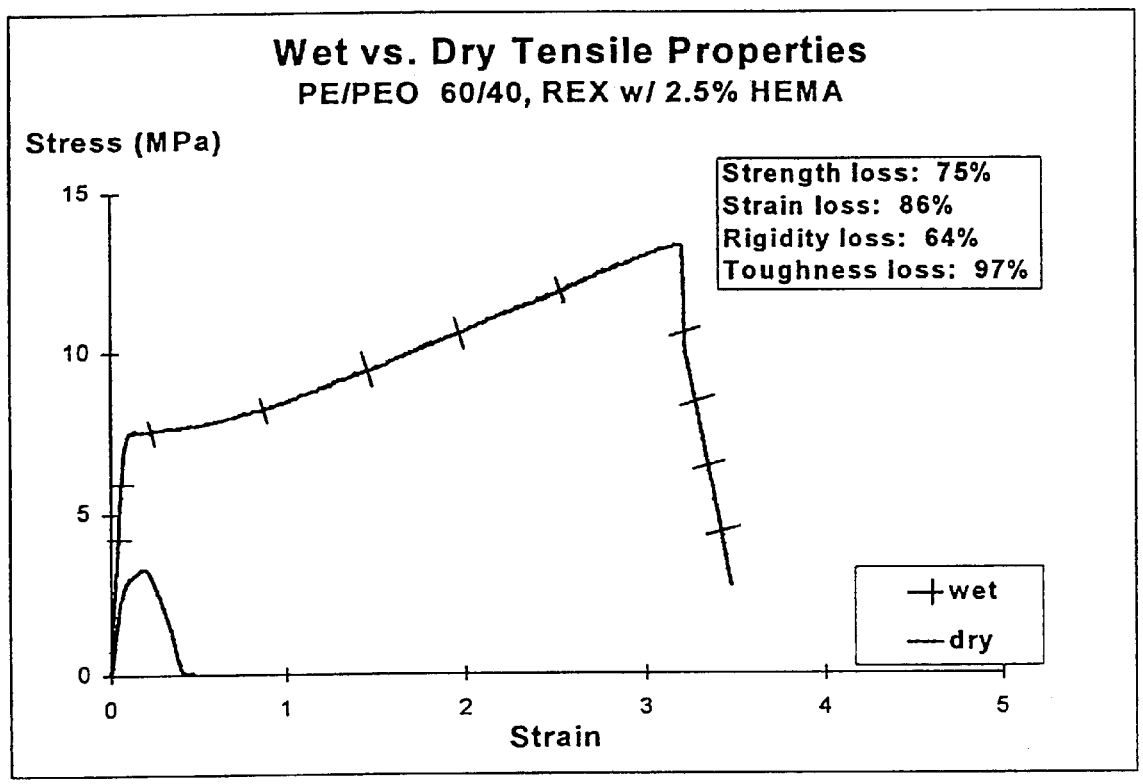
FIG. 10 is a graph illustrating the wet and dry tensile curves of a film of the inverse phase composition of Example 10.

The dry and wet tensile curves for the non-inverse phase blend of Comparative Example A are shown in FIG. 9. As can be observed from FIG. 9, a film of non-inverse phase blend does not lose an appreciable amount of its mechanical properties when exposed to water. Specifically, the non-inverse phase film of Comparative Example A there showed no loss, 0 percent, in elongation to break, and 16%, 2% and 47 percent losses in peak stress, energy-to-break and modulus, respectively. The non-inverse phase film of Comparative Example A was observed to be not wettable. In contrast, compositions and films of the present invention are wettable and lose a significant amount of the their mechanical properties, including tensile strength, upon exposure to water. A significant decrease in tensile strength is illustrated in FIG. 10. FIG. 10 shows the wet and dry tensile curves of a film of Example 10. It was determined that the film lost most of its tensile strength after 30 seconds of exposure to water.

While the invention has been described with reference to a preferred embodiment, those skilled in the art will appreciate that various substitutions, omissions, changes and modifications may be made without departing from the spirit hereof. Accordingly, it is intended that the foregoing examples be deemed merely exemplary of the present invention an not be deemed a limitation thereof.

We claim:

1. A method for making an inverse phase composition comprising combining:

a) a volume of a poly(ethylene oxide);

b) a volume of polyolefin, wherein said volume of polyolefin is greater than said volume of poly(ethylene oxide);

c) a polar vinyl monomer; and d) an initiator in a reaction vessel; and mixing the poly(ethylene oxide), the polyolefin, the initiator and the polar vinyl monomer under sufficient temperature and shear conditions to graft the polar vinyl monomer onto the poly(ethylene oxide) or the polyolefin and produce an inverse phase composition, said inverse phase composition characterized by a continuous phase of poly(ethylene oxide) and a dispersed phase of polyolefin.

2. The method of claim 1, wherein the initiator is free radical initiator.

3. The method of claim 1, wherein the polar vinyl monomer is selected from the group consisting of acrylates, methacrylates, 2-hydroxyethyl acrylate, 2-hydroxyethyl methacrylate, poly(ethylene glycol) acrylates, poly(ethylene glycol) methacrylates, poly(ethylene glycol) diacrylates, acrylic acid, methacrylic acid, maleic anhydride, itaconic acid, acrylamide, glycidyl methacrylate, 2-bromoethyl acrylate, 2-bromoethyl methacrylate, carboxyethyl acrylate, sodium acrylate, 3-hydroxypropyl methacrylate, 3-hydroxypropyl acrylate, 2-chloroacrylonitrile, 4-chlorophenyl acrylate, 2-cyanoethyl acrylate, glycidyl acrylate, 4-nitrophenyl acrylate, pentabromophenyl acrylate, poly(propylene glycol) acrylates, poly(propylene glycol) methacrylates 2-propene-1-sulfonic acid and its sodium salt, 2-sulfoethyl acrylate, 2-sulfoethyl methacrylate, 3-sulfopropyl acrylate, 3-sulfopropyl methacrylate, poly (ethylene glycol) alkyl ether acrylates, poly(ethylene glycol) alkyl ether methacrylates, poly(ethylene glycol) ethyl ether acrylates, poly(ethylene glycol) ethyl ether methacrylates and derivatives, analogs and combinations thereof.

4. The method of claim 1, wherein the polar vinyl monomer is a poly(ethylene glycol) methacrylate or 2-hydroxyethyl methacrylate.

5. The method of claim 3, wherein the poly(ethylene glycol) methacrylate is poly(ethylene glycol) ethyl ether methacrylate and has a number average molecular weight of not greater than about 5,000 grams per mol.

6. The method of claim 1, wherein the polar vinyl monomer is 2-hydroxyethyl methacrylate.

7. The method of claim 1, wherein the reaction vessel is an extruder.

8. The method of claim 7, wherein the is extruder is a twin-screw extruder.

9. The method of claim 7, wherein said polyolefin and said poly(ethylene oxide) are fed into the extruder before either the initiator or the monomer is fed into the extruder.

10. The method of claim 9, wherein the monomer and the initiator are added fed into the extruder by injecting a solution comprising the initiator and the monomer into the polyolefin and poly(ethylene oxide) after the polyolefin and poly(ethylene oxide) have been melted and mixed.

11. The method of claim 9, wherein the monomer is fed into the extruder and dispersed in the polyolefin and the poly(ethylene oxide) before the initiator is added.

12. The method of claim 1, wherein the conditions sufficient to graft the polar vinyl monomer comprises heating and melt mixing the poly(ethylene oxide), the polyolefin, the polar vinyl monomer and the initiator.

13. The method of claim 12, wherein the conditions sufficient to graft the polar vinyl monomer onto the poly (ethylene oxide) or the polyolefin comprise heating the poly(ethylene oxide), the polyolefin, the polar vinyl monomer and the free radical initiator to a temperature within the range of the melting point of the polyolefin to the decomposition temperature of the poly(ethylene oxide).

14. The method of claim 13, wherein the appropriate conditions to graft the polar vinyl monomer onto the poly (ethylene oxide) or the polyolefin comprise heating the poly(ethylene oxide), the polar vinyl monomer and the free radical initiator to a temperature within the range of about 120° C. to about 220° C.

15. The method of claim 1, wherein the poly(ethylene oxide) has an initial approximate molecular weight ranging from about 50,000 grams per mol to about 8,000,000 grams per mol.

16. The method of claim 15, wherein the poly(ethylene oxide) has an initial approximate molecular weight ranging from about 100,000 grams per mol to about 8,000,000 grams per mol.

17. The method of claim 16, wherein the poly(ethylene oxide) has an initial approximate molecular weight ranging from about 200,000 grams per mol to about 6,000,000 grams per mol.

18. The method of claim 1, wherein the polar vinyl monomer is added within the range of about 0.1 to about 20 weight percent relative to the weight of the poly(ethylene oxide) and the polyolefin.

19. The method of claim 18, wherein the polar vinyl monomer is added within the range of about 0.5 to about 10 weight percent relative to the weight of the poly(ethylene oxide) and the polyolefin.

20. The method of claim 1, wherein the initiator is added within the range of about 0.05 to about 1 weight percent relative to the weight of the poly(ethylene oxide) and the polyolefin.

21. The method of claim 20, wherein the initiator is added within the range of about 0.1 to about 0.75 weight percent relative to the weight of the poly(ethylene oxide) and the polyolefin.

22. The method of claim 20, wherein the initiator is added within the range of about 0.1 to about 0.5 weight percent relative to the weight of the poly(ethylene oxide) and the polyolefin.

23. An inverse phase composition produced by the method of claim 1.

24. A method for making an inverse phase composition comprising:

adding to a reaction vessel a volume of poly(ethylene oxide), a volume of polyolefin greater than the volume of poly(ethylene oxide), from about 0.1 to about 20 weight percent relative to the weight of the poly (ethylene oxide) and polyolefin of a polar vinyl, monomer and from about the range of about 0.05 to about 0.1 weight percent relative to the weight of the poly (ethylene oxide) and polyolefin of a free radical initiator;

mixing the poly(ethylene oxide), the polyolefin, the polar vinyl monomer and the free radical initiator; and heating the mixture to above the melting point of the poly(ethylene oxide) to form inverse phase composition characterized by a continuous phase of poly (ethylene oxide) and a dispersed phase of polyolefin.

25. A method for making an inverse phase composition comprising:

adding a volume of poly(ethylene oxide), a volume of polyolefin greater than the volume of poly(ethylene oxide), from about 0.1 to about 20 weight percent of a polar vinyl monomer relative to the weight of the poly(ethylene oxide), and a free radical initiator into an extruder; and mixing and heating the poly(ethylene oxide), the polyolefin, the polar vinyl monomer and the free radical initiator while extruding in order to form an inverse phase composition characterized by a continuous phase of poly(ethylene oxide) and a dispersed phase of polyolefin.

26. A method of making an inverse phase composition comprising:

combining a volumetric majority of polyolefin and a volumetric minority of poly(ethylene oxide), said poly (ethylene oxide) having an average molecular weight of less than 200,000 grams per mol, wherein said inverse phase composition exhibits an inverse phase morphology so that said volumetric minority of poly(ethylene oxide) forms a continuous phase in said composition and said volumetric majority of polyolefin constituent forms a dispersed phase in said composition.

27. The method of making an inverse phase composition of claim 26, wherein said poly(ethylene oxide) has an average molecular weight of less than about 150,000 grams per mol.

28. The method of making an inverse phase composition of claim 26, wherein said poly(ethylene oxide) consists essentially of a poly(ethylene oxide) having an average molecular weight of not greater than about 100,000 grams per mol.

29. A method of making an inverse phase composition comprising:

melt mixing a volume of polyolefin and a volume of poly(ethylene oxide), said volume of polyolefin greater than said volume of poly(ethylene oxide) and said poly(ethylene oxide) consisting essentially of a poly (ethylene oxide) having an average molecular weight of not greater than about 150,000 grams per mol or a poly(ethylene oxide) grafted with a polar vinyl monomer, whereby said inverse phase composition exhibits an inverse phase morphology so that said poly(ethylene oxide) forms a continuous phase in said composition and said polyolefin forms a dispersed phase in said continuous phase.

* * * * *